US007975127B2

(12) United States Patent
Seki

(10) Patent No.: US 7,975,127 B2
(45) Date of Patent: Jul. 5, 2011

(54) COMPUTER SYSTEM FOR PROCESSING INSTRUCTIONS EACH CONTAINING A GROUP OF OPERATIONS TO BE EXECUTED OUT OF ORDER

(76) Inventor: Hajime Seki, Matsuyama (JP)

( * ) Notice: Subject to any disclaimer, the term of this patent is extended or adjusted under 35 U.S.C. 154(b) by 451 days.

(21) Appl. No.: 10/344,698

(22) PCT Filed: Aug. 29, 2001

(86) PCT No.: PCT/JP01/07442
§ 371 (c)(1), (2), (4) Date: Feb. 25, 2003

(87) PCT Pub. No.: WO02/19101
PCT Pub. Date: Mar. 7, 2002

(65) Prior Publication Data
US 2003/0177337 A1    Sep. 18, 2003

(30) Foreign Application Priority Data
Aug. 31, 2000   (JP) ................................. 2000-263170

(51) Int. Cl.
*G06F 9/30* (2006.01)
(52) U.S. Cl. ........................................................ 712/202
(58) Field of Classification Search .................... 712/202
See application file for complete search history.

(56) References Cited

U.S. PATENT DOCUMENTS

| | | | |
|---|---|---|---|
| 5,694,564 A | 12/1997 | Alsup et al. | |
| 5,727,176 A | 3/1998 | Clift et al. | |
| 5,841,999 A | 11/1998 | Le et al. | |
| 5,903,740 A * | 5/1999 | Walker et al. | 712/217 |
| 5,961,636 A | 10/1999 | Brooks et al. | |
| 5,974,531 A * | 10/1999 | Shang et al. | 712/202 |
| 6,009,509 A * | 12/1999 | Leung et al. | 712/202 |
| 6,088,786 A * | 7/2000 | Feierbach et al. | 712/200 |
| 6,134,573 A * | 10/2000 | Henry et al. | 708/510 |
| 6,237,086 B1 * | 5/2001 | Koppala et al. | 712/226 |
| 6,256,725 B1 * | 7/2001 | Batten et al. | 712/200 |
| 6,502,184 B1 * | 12/2002 | Zhang et al. | 712/202 |
| 6,564,312 B1 * | 5/2003 | Duranton | 712/202 |
| 6,633,970 B1 * | 10/2003 | Clift et al. | 712/217 |

OTHER PUBLICATIONS

C K Yuen, "Stack and RISC," Computer Architecture News, vol. 27 ( No. 1), p. 3-9, (1999).
K. C. Yeager, "The Mips R10000 Superscalar Microprocessor," IEEE Micro, p. 28-40, (Apr. 1996).

* cited by examiner

*Primary Examiner* — Jacob Petranek
(74) *Attorney, Agent, or Firm* — DLA Piper LLP (US)

(57) ABSTRACT

A computer system comprising a data file having entries each of which is designed to hold data, an advanced and a completed mapping file each having entries each of which is designed to hold a data-file-entry address, an operation window that is a buffer to hold substances of operations waiting execution, and a state-modification queue that is designed to be able to hold a substance of a modification on the advanced mapping file for each clock cycle; wherein making a modification on the advanced mapping file, entering the substance of this modification into the state-modification queue, and entering substances of operations into the operation window are each to be done in one clock cycle, and operations held in the operation window are to be executed out of order. The system can attain high performance easily and utilize programs described in any machine language for traditional register-based/stack-based processors.

8 Claims, 17 Drawing Sheets

COMPUTER SYSTEM FOR PROCESSING INSTRUCTIONS EACH CONTAINING A GROUP OF OPERATIONS TO BE EXECUTED OUT OF ORDER

FIELD OF THE INVENTION

The present invention relates to a computer system of a novel construction that can attain high performance by providing a high degree of instruction-level parallelism.

DESCRIPTION OF THE PRIOR ART

So far, versatile computer systems that have ever been put to practical use can be roughly classified as register-based machines or stack machines. Stack machines are superior in smallness of program code size and in quickness of interruption handling and context switching, though they have difficulty in attaining high performance. On the other hand, register-based machines can relatively easily attain high performance, but, in many other aspects, they are inferior to stack machines.

There is no program compatibility between register-based machines and stack machines, and as mentioned above, neither are absolutely superior.

The object of the present invention is to materialize a computer system that can harmonize itself both with the instruction system of register-based machines and with that of stack machines, and that can attain high performance.

SUMMARY OF THE INVENTION

The computer system according to the present invention is basically similar to superscalar architectures capable of out-of-order execution, though it adopts an instruction format of large bit length, in which substances of operations and a substance of a state modification to be made on the virtual logical registers/operand stack are to be specified.

The computer system according to the present invention comprises a data file having entries each of which is designed to hold data, a free list that is designed to hold unallocated-data-file-entry addresses, an advanced and a completed mapping file each having entries each of which is designed to hold a data-file-entry address, an operation window that is a buffer to hold substances of operations waiting execution, a state-modification queue that is designed to hold substances of state modifications on mapping file indicated in instructions, and functional units for executing operations of respective kinds.

The computer system of the present invention is so structured as to, in issuing one instruction per clock cycle, enter substances of the operations into the operation window, make a modification on the advanced mapping file, and enter the substance of this modification into the state-modification queue. In the case of an operation to generate result data, a data-file entry is newly allocated to hold the result data, and this makes the destination register. Besides, what makes each source register of operations is either a data-file entry whose address is obtained by accessing the advanced mapping file, or a data-file entry that is being allocated as destination register of an operation contained in the same instruction.

Each unexecuted operation held in the operation window is to be executed out of order by one of the functional units.

After each operation derived from the same instruction that produced the substance of the head part of the state-modification queue is terminated normally, in accordance with the substance of the head part of the state-modification queue, contents of the completed mapping file is to be modified so as to reproduce the modification that was made on the advanced mapping file in the course of issue of the instruction, and the head part is to be dequeued from the state-modification queue.

The computer system of the present invention can operate in either of the two modes: the stack mode and the register mode. In the case of processing a program translated from machine language of register-based RISC/CISC processors in conformity to the instruction format for the computer system of the present invention, the system is to operate in the register mode. On the other hand, in the case of processing a program translated from machine language for stack-based processors in conformity to the instruction format for the computer system of the present invention, the system is to operate in the stack mode. It is easy to transform a plurality of instructions of a register machine/stack machine into an instruction of the computer system of the present invention, so the system can efficiently process a wide range of programs.

In the register mode, each mapping file is to be used as an equivalent of register-mapping table of a register-based superscalar processor.

In the stack mode, each mapping file is to be used to hold a kind of stack. Such a state of the operand stack as { . . . , word4, word3, word2, word1} (the right end is the top of the stack) in a traditional stack machine corresponds to such a state of the stack held by mapping file as { . . . , d, c, b, a} (the right end is the top of the stack), with word1, word2, word3 and word4 respectively (to be) held in the data-file entries whose respective addresses are a, b, c and d, in the computer system of the present invention.

PREFERRED EMBODIMENTS OF THE INVENTION

In the following, a preferred computer system according to the present invention is described.
(1) Basic Structure
To begin with, the basic structure of the computer system of this embodiment is described.

Figure 1:
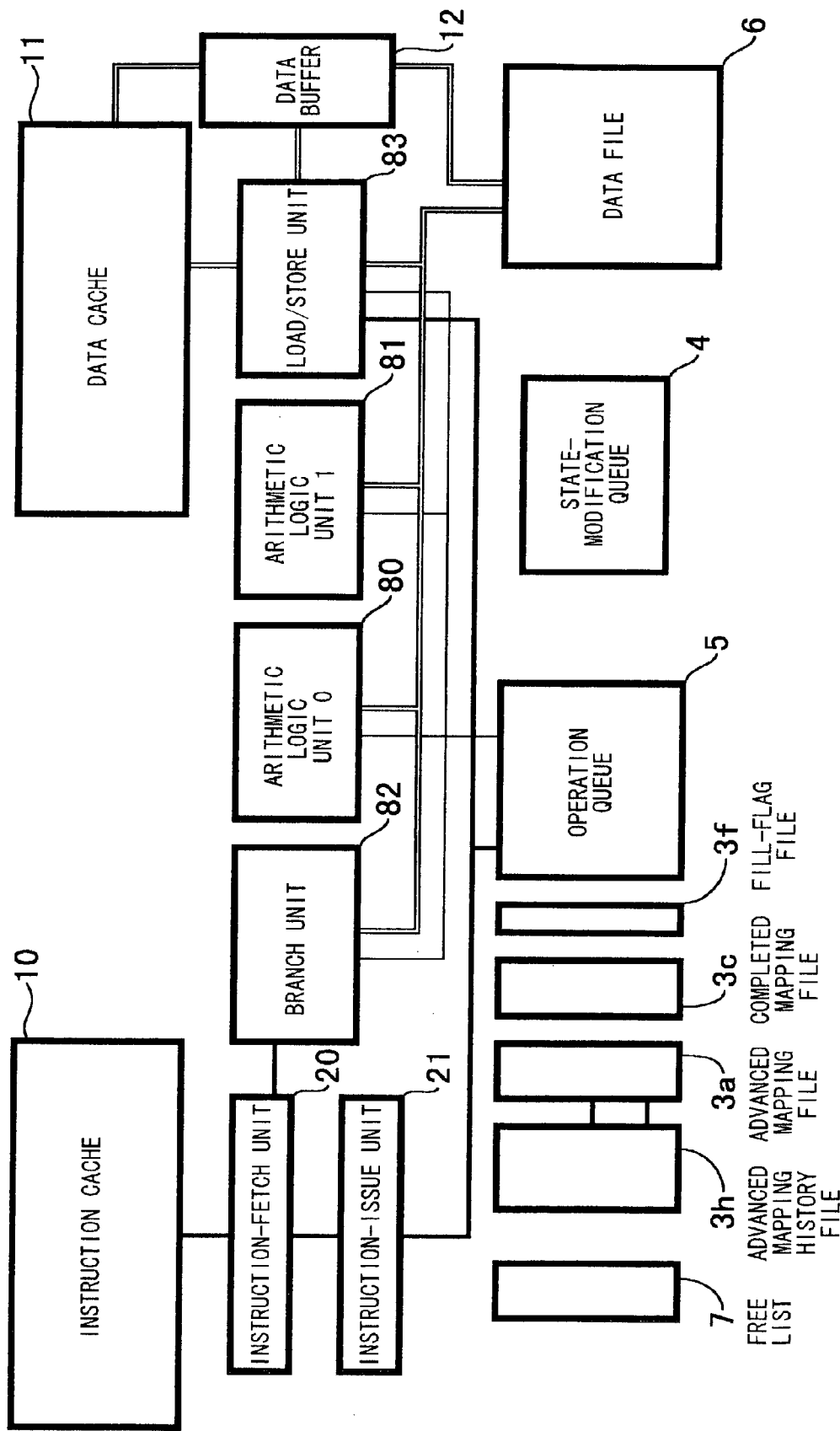
FIG. 1 is a block diagram showing the basic structure of a preferred computer system according to the present invention.

FIG. 1 is a block diagram of the computer system. Shown in FIG. 1 are an instruction cache 10, a data cache 11, a data buffer 12, an instruction-fetch unit 20, an instruction-issue unit 21, an advanced mapping file 3a, a completed mapping file 3c, a fill-flag file 3f, an advanced mapping history file 3h, a state-modification queue 4, an operation queue 5, a data file 6, a free list 7, arithmetic logic units 80 and 81, a branch unit 82, and a load/store unit 83.

The computer system of the present invention needs to have an operation window, which is a buffer to hold substances of operations waiting execution. There are basically two ways to implement the operation window: centralized type and distributed type. The computer system of this embodiment is supposed to have an operation queue of centralized type.

The computer system of the present invention can operate in either of the two modes: the register mode and the stack mode. In the case of processing a program translated from machine language of register-based RISC/CISC processors in conformity to the instruction format for the computer system of the present invention, the system is to operate in the register mode. On the other hand, in the case of processing a program translated from machine language for stack-based processors in conformity to the instruction format for the computer system of the present invention, the system is to operate in the stack mode.

The computer system of the present invention has mapping files whose entries are each designed to hold a data-file-entry address, and that are to function in the same way as register-mapping tables of a register-based superscalar processor capable of out-of-order execution in the register mode. In the present invention, the mapping files are to function equivalently in the stack mode as well.

(2) Instruction Format

Figure 2:
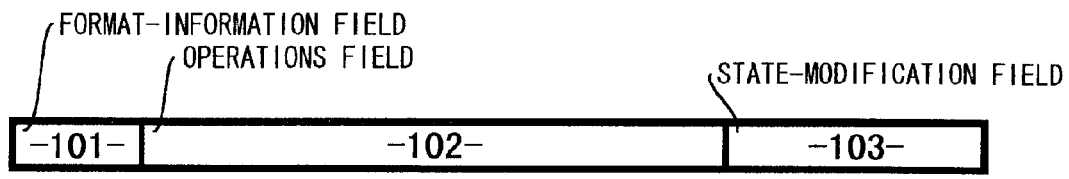
FIG. 2 is a conceptual drawing of the instruction format for a preferred computer system according to the present invention.

FIG. 2 is a conceptual drawing of the instruction format for the computer system of this embodiment. Both for the register mode and for the stack mode, the format of each instruction basically consists of a format-information field 101, an operations field 102, and a state-modification field 103.

Specified in the format-information field (FI field) are the length of the instruction, the number of operations the instruction contains, and the like.

Specified in the operations field (Op field) are substances of operations: arithmetic logic operations, branches, loads, stores, and the like. In this embodiment, each operation is expressed in the form similar to the instruction format for RISC processors. In this embodiment, each instruction is supposed to contain up to 4 operations (such instructions as to contain a branch operation do not necessarily contain 4 operations).

Specified in the state-modification field (SM field) is substance of a modification on mapping file, i.e. state modification on the virtual registers (in the register mode)/the virtual operand stack (in the stack mode). As described later, the register mode differs from the stack mode in format inside the state-modification field.

In the case of an operation to generate result data, a data-file entry is to be newly allocated to hold the result data. The logical position of this entry is to be indicated by the content of the SM field.

The computer system of this embodiment is supposed to be able to issue one instruction in the above-mentioned format per cycle.

(2-1) Instruction Format for the Register Mode

In the following, the instruction format for the register mode is explained.

In the computer system of this embodiment, each data-file entry is supposed to be able to hold data that is to be held by a register of the virtual register machine. With r0, r1, r2, . . . representing contents of mapping-file entries of address 0, 1, 2, . . . respectively, data-file entries whose respective addresses are r0, r1, r2, . . . are supposed to respectively hold data of register R0, R1, R2, . . . of the virtual register machine.

For example, a program for the register machine to load data of variables A, B and X from memory into registers, compute $(A*X+B/X)*2$, and store the result into memory as variable Y can be written as follows:

| | |
|---|---|
| LOAD R1, 100[R0]; | load the value at address {the value in R0 + 100} into register R1 |
| LOAD R4, 400[R0]; | load the value at address {the value in R0 + 400} into register R4 |
| MUL R5, R1, R4; | R5 = R1*R4 |
| LOAD R2, 200[R0]; | load the value at address {the value in R0 + 200} into register R2 |
| DIV R4, R2, R4; | R4 = R2/R4 |
| ADD R5, R5, R4; | R5 = R5 + R4 |
| MUL R5, R5, 2; | R5 = R5*2 |
| STORE 500[R0], R5; | store the value in register R5 at address {the value in R0 + 500} | where, the addresses of variables A, B, X and Y in memory are 100, 200, 400 and 500 each added to the value in R0, respectively.

Now, how to transform the above program into instructions for the register mode of the computer system of this embodiment is explained.

Partitioning the above program into groups each consisting of 4 instructions, and expressing the operation and the modification to be made on mapping file separately for each instruction, you can transform the above program as follows:

| | | |
|---|---|---|
| Instruction_1a | load f1, 100[r0] | ; 1:f1 |
| Instruction_1b | load f2, 400[r0] | ; 4:f2 |
| Instruction_1c | mul f3, f1, f2 | ; 5:f3 |
| Instruction_1d | load f4, 200[r0] | ; 2:f4 |
| Instruction_2a | div f1, r2, r4 | ; 4:f1 |
| Instruction_2b | add f2, r5, f1 | ; 5:f2 |
| Instruction_2c | mul f3, f2, 2 | ; 5:f3 |
| Instruction_2d | store 500[r0], f3 | | where, addresses of the data-file entries to be newly allocated to hold result data are represented by f1, f2, . . . in order for each group of instructions. In this embodiment, f1, f2, . . . correspond to contents that are to be taken out of the free list in each cycle.

Instruction__1a implies to load the value at address {100 added to the value in the data-file entry corresponding to r0}, write it into the data-file entry corresponding to f1, and replace the content of the mapping-file entry of address 1 with the address of the data-file entry corresponding to f1. Instruction__1c implies to multiply the value in the data-file entry corresponding to f1 by the value in that corresponding to f2, write the result data into the data-file entry corresponding to f3, and replace the content of the mapping-file entry of address 5 with the address of the data file entry corresponding to f3. The other instructions imply likewise.

For each of the two groups of instructions, putting four instructions together, and expressing operations and modifications to be made on mapping file separately, one can transform the above program as follows:

```
Op{load f1, 100[r0]; load f2, 400[r0]; mul f3, f1, f2; load f4, 200[r0]}
SM{1:f1, 2:f4, 4:f2, 5:f3}
Op{div f1, r2, r4; add f2, r5, f1; mul f3, f2, 2; store 500[r0], f3}
SM{4:f1, 5:f3}.
```

These are the contents of the Op and SM fields of two instructions in the case where the above program is so transformed as to conform to the instruction format for the register mode of the computer system of this embodiment. In transforming into the second instruction, though there were two alterations on the mapping-file entry of address 5, only the last one is held in the SM field. As above, as for the instruction format for the register mode, combinations of address of a mapping-file entry on which an alteration is to be made and sign standing for stuff to enter are to be listed in the SM field.

Here, f1, f2, f3, . . . appearing in operations in the Op field as substitutes for destination registers are to be mechanically allotted in order, so they could be omitted. In this embodiment, however, they are supposed to be explicitly indicated.

(2-2) Instruction Format for the Stack Mode

Next, the instruction format for the stack mode is explained.

In the computer system of this embodiment, each data-file entry is supposed to be able to hold data that is to be held by an entry of the operand stack of the virtual stack machine. Namely, with . . . , s3, s2, s1 representing contents of the stack held by mapping file (the right end is the top of the stack), the operand stack of the virtual stack machine is supposed to be constructed by lining up data that are to be held in data-file entries whose respective addresses are . . . , s3, s2, s1 in order.

For example, a program for the stack machine to compute A*X+B/X, and store the result into memory as variable Y can be written as follows:

| | | |
|---|---|---|
| LOAD <4>; | push the value of local variable <4> onto the operand stack | |
| DUP; | duplicate the top word on the stack, and push the duplicate onto the stack | |
| LOAD <1>; | push the value of local variable <1> onto the operand stack | |
| MUL; | pop two words from the stack, multiply them, and push the result onto the stack | |
| SWAP; | swap top two words on the operand stack | |
| LOAD <2>; | push the value of local variable <2> onto the operand stack | |
| SWAP; | swap top two words on the operand stack | |
| DIV; | pop two words from the stack, divide by the top word, and push the result onto the stack | |
| ADD; | pop two words from the stack, add them, and push the result onto the stack | |
| STORE <5>; | store the value on the top of the stack into local variable <5> | | where, the storage areas of variables A, B, X and Y are local variables <1>, <2>, <4> and <5>, respectively.

Now, how to transform the above program into instructions for the stack mode of the computer system of this embodiment is explained.

Partitioning the above program into two groups of instructions, and expressing the operation and the modification to be made on mapping file separately for each instruction, one can transform the above program as follows:

| | | |
|---|---|---|
| Instruction_1a | load f1, <4> | ; +1: f1 |
| Instruction_1b | add f2, f1, 0 | ; +2: f1, f2 |
| Instruction_1c | load f3, <1> | ; +3: f1, f2, f3 |
| Instruction_1d | mul f4, f2, f3 | ; +2: f1, f4 |
| Instruction_1e | (swap) | ; +2: f4, f1 |
| Instruction_2a | load f1, <2> | ; +1: f1 |
| Instruction_2b | (swap) | ; +1: f1, s1 |
| Instruction_2c | div f2, f1, s1 | ; 0: f2 |
| Instruction_2d | add f3, s2, f2 | ; −1: f3 |
| Instruction_2e | store <5>, f3 | ; −2: | where, in the same way as for the register mode, addresses of the data-file entries to be newly allocated to hold result data are represented by f1, f2, . . . in order for each group of instructions. Besides, as for each modification to be made on mapping file, the number of entries by which the stack held by mapping file is to grow and stuff to write in the vicinity of the top of the stack are indicated.

Instruction_1a implies to load the value of local variable <4>, write it into the data-file entry corresponding to f1, grow the stack held by mapping file by one entry, and make the new top-of-the-stack entry to hold the address of the data-file entry corresponding to f1. Instruction_1b implies likewise, though the modification to be made on mapping file is expressed with that to be made by Instruction_1a involved. The other instructions imply likewise.

For each of the two groups of instructions, putting instructions together, and expressing operations and modifications to be made on mapping file separately, one can transform the above program as follows:

```
Op{load f1, <4>; add f2, f1, 0; load f3, <1>; mul f4, f2, f3}
SM{+2: f4, f1}
Op{load f1, <2>; div f2, f1, s1; add f3, s2, f2; store <5>, f3}
SM{−2:}.
```

These are the contents of the Op and SM fields of two instructions in the case where the above program is so transformed as to conform to the instruction format for the stack mode of the computer system of this embodiment. As above, as for the instruction format for the stack mode, the amount of stack growth and a series of signs standing for post-modification stuff in the vicinity of the top of the stack are to be specified in the SM field.

Here, as stated for the register mode, f1, f2, f3, . . . appearing in operations in the Op field as substitutes for destination registers are to be mechanically allotted in order, so they could be omitted. In this embodiment, however, they are supposed to be explicitly indicated.

So far, how programs for a register machine/stack machine are transformed to conform to the instruction format for the computer system of this embodiment has been explained. A program to be processed by the computer system of the present invention, however, need not necessarily be a one into which a program for a register machine/stack machine is transformed.

For example, a program for the stack mode to compute A+(B/2)*X+(C/3)*X*X, store the result into memory as variable Y, and pile the values of factors A, B/2 and C/3 in order on the operand stack may be such as follows:

```
Op{load f1, 8[s2]; load f2, 16[s2]; div f3, f2, 2; load f4, 24[s2]}
SM{+3: f1, f3, f4}
Op{div f1, s1, 3; load f2, 200[s4]; mul f3, f2, f2; mul f4, s2, f2}
SM{+2: f1, f4, f3}
```

-continued

```
Op{mul f1, s3, s1; add f2, s5, s2; add f3, f2, f1; store 400[s6], f3}
SM{-2:}
``` where, the addresses of variables A, B and C in memory are respectively 8, 16 and 24 each added to the value in the entry under the top of the initial virtual operand stack, and the addresses of variables X and Y are respectively 200 and 400 each added to the value in the entry at the top of the initial virtual operand stack.

(3) Register Mode (3-1) Functions and Structures Required for the Action in the Register Mode Here, the function and structure of each component of the computer system of this embodiment used for the action in the register mode are described. They are the functions and structures needed in the stack mode as well.

(A) Instruction-Fetch Unit

The instruction-fetch unit is furnished with a program counter, which is not shown in the figures, and so structured as to fetch instructions from the instruction cache and deliver them to the instruction-issue unit. It also carries out prediction and execution of branches.

(B) Instruction-Issue Unit

The instruction-issue unit is so structured as to, in issuing each instruction delivered from the instruction-fetch unit, generate various signals to modify the advanced mapping file, the data file, etc., and enter substances into the operation queue and the state-modification queue.

(C) Mapping Files

A mapping file is so structured as to have entries, each of which can hold a data-file-entry address. In the register mode, each mapping file is to be used as an equivalent of register-mapping table of register-based superscalar processors.

The computer system of the present invention is furnished with two mapping files: an advanced mapping file (AMF) and a completed mapping file (CMF). These two mapping files are of the same shape, and their respective entries correspond to each other.

In the computer system of the present invention, each time an instruction is issued, a modification according with the instruction is made on the advanced mapping file (hereafter, it may be referred to as the AMF). Namely, the advanced mapping file is to reflect substances of all the instructions that have been issued.

On the other hand, the completed mapping file (hereafter, it may be referred to as the CMF) is to reflect substances of all the instructions that have been completed in program-sequential order. The computer system of the present invention is capable of out-of-order execution of operations contained in the issued instructions. And, for securing precise handling of exceptions, the completed mapping file enables the system to construct the state grounded on all the instructions completed in order.

The computer system of this embodiment is furnished with an advanced mapping history file (hereafter, it may be referred to as the AMF history file) for incarnation of speculative execution based on branch prediction. Each entry of the AMF history file is designed to be able to hold contents of all the AMF entries and later-described register PP-A.

(D) Data File (DF)

The data file (hereafter, it may be referred to as the DF) comprises physical registers: P00, P01, P02, . . . .

Figure 3:
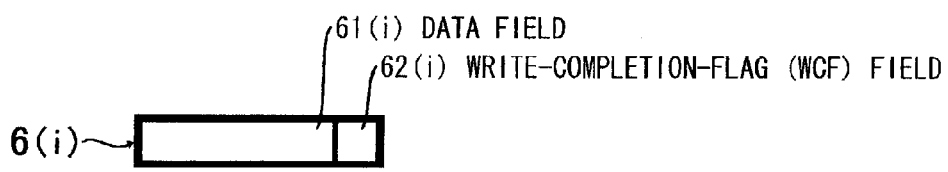
FIG. 3 illustrates the structure of an entry of the data file.

FIG. 3 illustrates the structure of entry 6(i) of the DF 6 in the computer system of this embodiment. Here, "i" stands for entry address. Each entry 6(i) of the DF 6 comprises data field 61(i) and write-completion-flag (WCF) field 62(i).

As for the hardware implementation, the DF is practically made of register files that respectively correspond to the fields listed above.

The data field of each DF entry is designed to hold a word of data.

In each DF entry, the WCF field is supposed to hold "1" in the case where data is already written in the data field, and hold "0" otherwise.

(E) Free List (FL)

The free list (hereafter, it may be referred to as the FL) is to hold addresses of free, namely, unallocated DF entries. In this embodiment, the FL is constructed as a circular FIFO queue.

In the initialized state, the addresses of all DF entries are registered on the FL. In the case where a DF entry needs to be newly allocated, a free-DF-entry address is to be taken out of the FL. Conversely, if a DF entry is released from allocation, the address of this entry is to be registered on the FL.

(F) Operation Queue (OQ)

The operation queue (hereafter, it may be referred to as the OQ) is a buffer to hold substances of operations contained in instructions that are already issued but not yet completed, and is constructed as a circular FIFO queue.

Figure 4:
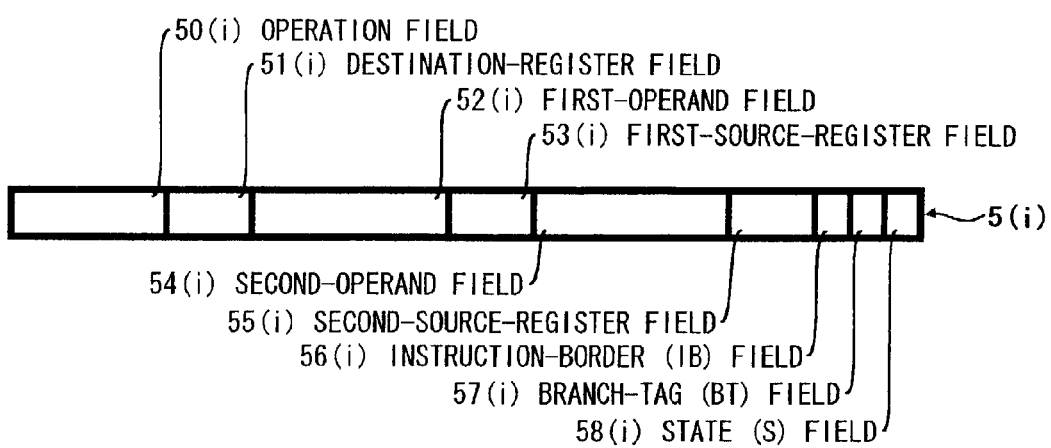
FIG. 4 illustrates the structure of an entry of the later-described operation queue.

FIG. 4 illustrates the structure of entry 5(i) of the OQ 5 in the computer system of this embodiment. Here, "i" stands for entry address. Each entry 5(i) of the OQ 5 comprises operation field 50(i), destination-register field 51(i), first-operand field 52(i), first-source-register field 53(i), second-operand field 54(i), second-source-register field 55(i), instruction-border (IB) field 56(i), branch-tag (BT) field 57(i) and state (S) field 58(i).

The operation field of each OQ entry is designed to hold an operation code.

The destination-register field of each OQ entry is designed to hold an address of DF entry allocated as destination register of the operation.

Each of the first- and second-operand fields of each OQ entry is designed to hold an operand value required for the operation.

Each of the first- and second-source-register fields of each OQ entry is designed to hold an address of DF entry allocated as source register of the operation.

In each OQ entry, the IB field is supposed to hold "1" in the case where the entry was at the tail of the queue when the substance of operation, contained in an issued instruction, was entered into the OQ, and hold "0" otherwise.

The BT field of each OQ entry is concerned with speculative execution based on branch prediction. In this embodiment, as described later, there is a certain relationship between branch tags to be entered in BT fields and entry addresses in the AMF history file.

In each OQ entry, indicated in the S field is "unexecuted", "normal termination", "occurrence of exception" or the like according to the state of the operation held in the entry.

The OQ is furnished with comparators for each source-register field of each entry, and has associative functions, by which the content of each source-register field is compared with DF-entry addresses and data is written into the operand field corresponding to each matched source-register field.

(G) State-Modification Queue (SMQ)

The state-modification queue (hereafter, it may be referred to as the SMQ) is a buffer to hold substances of modifications on mapping file indicated in instructions that are already issued but not yet completed, and is constructed as a circular FIFO queue. In this embodiment, each entry of the SMQ is to correspond to the SM field of an instruction.

(H) Functional Units

As shown in FIG. 1, the computer system of this embodiment is furnished with four functional units: arithmetic logic unit 0 and 1, a branch unit and a load/store unit (hereafter, it may be referred to as the LSU). These are to operate in parallel independently of each other.

(3-2) Action in the Register Mode

Next, the action in the register mode of the computer system of this embodiment is described.

The computer system of this embodiment processes instructions through four stages: [1] instruction-fetch, [2] instruction-issue, [3] operations-execution, and [4] instruction-completion stage. In the following, the action in each stage is described.

[1] Instruction-Fetch Stage

In this stage, the instruction-fetch unit fetches an instruction from the instruction cache, and determines the address of the instruction to fetch next. Ordinarily, it is from the next address to fetch next. But, in the case where the fetched instruction includes either an unconditional branch operation or a conditional branch operation with a prediction of taking a branch, the case where a branch prediction turns out to have missed, or the case where an exception occurs, the address of the instruction to fetch next is changed.

[2] Instruction-Issue Stage

In this stage, substances of operations according with the contents of the Op field of the instruction to be issued are entered into the operation queue (OQ), a modification according with the contents of the SM field is made on the advanced mapping file (AMF), and the substance of this modification is entered into the state-modification queue (SMQ). At this juncture, r0, r1, r2, ... in the instruction are respectively replaced by pre-alteration contents of AMF entries of address 0, 1, 2, ..., and f1, f2, ... are respectively replaced by DF-entry addresses that are taken out of the free list (FL) in order.

In the IB field of each OQ entry into which substance of an operation contained in the instruction is being entered, "1" is entered for the OQ entry getting to be at the tail of the queue, and "0" is entered for those otherwise. In the BT field of each of the OQ entries, the branch tag forwarded from the instruction-issue unit is entered.

In the WCF field of each of the DF entries newly allocated in the course of issue of the instruction (in respective correspondence with f1, f2, f3, ... ), "0" is entered.

In the case of a load/store operation, its substance is not only entered into the OQ, but also, together with the address of the OQ entry into which the substance is being entered, delivered to the LSU.

As for each writing of a DF-entry address replacing any of r0, r1, r2, ... into a source-register field on the OQ, in the next cycle, contents of the DF entry of that address will be read out. In the case of the WCF-field content being "1", the data, together with the DF-entry address, will be conveyed to the OQ. Then, on the OQ, each source-register-field content will be compared with the conveyed DF-entry address, and the data will be written into the operand field(s) corresponding to the matched source-register field(s).

[3] Operations-Execution Stage

Each of unexecuted operations held in the OQ is to be executed after becoming executable. Therefore, operations are executed out of order.

If there is an OQ entry where each required source data is written in the appropriate operand field, and if a functional unit that has the function of executing the operation held in that OQ entry is available, the substance of the entry, together with the entry address, is to be transmitted to the functional unit, and to be processed.

As for each operation to generate result data, such as load and arithmetic/logic operations, if result data is obtained normally, it is to be written into the data field of the destination DF entry, and the WCF field is to be altered to "1". Besides, on the OQ, each source-register-field content is to be compared with the address of the above destination DF entry, and the result data is to be written into the operand field(s) corresponding to the matched source-register field(s), if any.

As for each OQ entry holding a substance of a load/store operation, the same substance was delivered to the LSU in the instruction-issue stage. In this embodiment, each operand data required for address calculation that was not arranged in the instruction-issue stage is supposed to be transmitted to the LSU right after entered into the OQ entry.

The LSU executes load operations out of order. As for store operations, the LSU will perform stores in the instruction-completion stage so that precise handling of exceptions may be secured, though it performs address calculations out of order in the operations-execution stage. Therefore, in the case of a store operation, when the store data and the store address are both arranged, it is taken for terminated normally as action in the operations-execution stage.

If an operation is terminated normally, the S field of the OQ entry holding the substance of this operation is to be altered to "normal termination".

In the case where an exception occurs in executing an operation, this piece of information is to be written into the S field of the OQ entry holding the substance of that operation, and to be communicated to the instruction-fetch unit.

[4] Instruction-Completion Stage

Instructions are completed in program-sequential order.

On the OQ, the entries ranging from the head one of the queue to the first one whose IB-field content is "1" hold the whole substances of the operations contained in the instruction to be completed next. If the S-field content is/becomes "normal termination" in each of the OQ entries in the above range, the instruction gets ready to be completed. To complete the instruction, the system dequeues the OQ entries in the above range, makes a modification according with the substance of the head entry of the state-modification queue (SMQ) on the CMF, and dequeues this head entry. Here, the modification that was made on the AMF in the course of issue of the instruction is being reproduced on the CMF.

Besides, in accordance with completion of the instruction, each address of DF entry to be released from allocation is to be registered on the FL. In the register mode, a set of addresses of DF entries to be released from allocation consists of the following two groups: the one(s) each of which is pre-alteration CMF-entry content being altered in the course of completion of the instruction, and the one(s) each being a destination-register-field content in the OQ entries to be dequeued that is not contained in the SMQ entry to be dequeued—not to be written in the CMF—. The computer system of the present invention could be so structured that registration of addresses of DF entries to be released from allocation onto the FL is to be carried out after the completion of the instruction. In this embodiment, however, it is supposed to be carried out at the same time as the completion of the instruction.

In the case of completing an instruction that includes a store operation, the system requests the LSU to perform the store. Thus, data are to be stored in program-sequential order for sure.

In the case where content of the S field is/becomes "occurrence of exception" in an OQ entry holding substance of an operation contained in the instruction to be completed next, as the virtual state at the point of the occurrence of exception on the assumption that the program was being executed in order can be constructed by means of the CMF and the DF at this time, precise handling of exceptions can be materialized. To cancel all the instructions that have been issued after the instruction that caused an exception, the system puts each address of DF entry allocated as destination register in the operations to be canceled back on the FL, and dequeues entries in the range that corresponds to the instructions to be canceled both on the OQ and on the SMQ.

The above is the overall action in the register mode of the computer system of this embodiment.

(3-3) Example Action in the Register Mode

Next, an example action is described. Now, let's consider processing, with the computer system of this embodiment, the above-mentioned program to compute $Y=(A*X+B/X)*2$ consisting of the following two instructions:

Instruction_1
Op{load f1, 100[r0]; load f2, 400[r0]; mul f3, f1, f2; load f4, 200[r0]}
SM{1:f1, 2:f4, 4:f2, 5:f3}
Instruction_2
Op{div f1, r2, r4; add f2, r5, f1; mul f3, f2, 2; store 500[r0], f3}
SM{4:f1, 5:f3}.

FIG. 6-12 show changes in the state of the computer system of this embodiment in the course of processing of the above program in order of time. With reference to these figures, detailed action is described below. In FIG. 6-12, the structure of each entry of the DF 6/OQ 5 is the same as in FIG. 3/FIG. 4.

Figure 6:
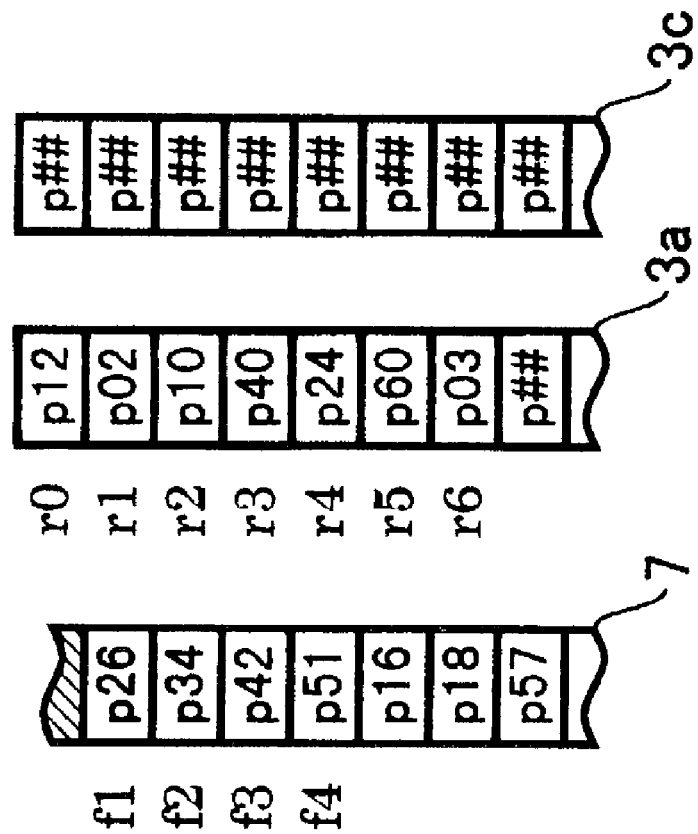
FIGS. 6-12 each show contents of the advanced mapping file, the completed mapping file, the state-modification queue, the operation queue, the data file, and the free list, at one of seven points in the course of an example action in the register mode.

Let us suppose that contents of the FL/AMF are such as those shown in FIG. 6 at the outset. Here, as for the FL 7, which is constructed as a circular FIFO queue, it is shown that the four entries from the head one of the queue downward respectively correspond to f1, f2, f3 and f4 for the instruction to be issued next. On the AMF 3a/CMF 3c, the entries are supposed to be tagged with address 0, 1, 2, ... from the top downward, and to correspond to r0, r1, r2, ..., respectively. As for places in which p## is entered, though a DF-entry address is written, you need not pay attention in the explanation of this example action.

Let us suppose that Instruction_1 is to be issued when the computer system is in such a state as shown in FIG. 6.

Figure 7:
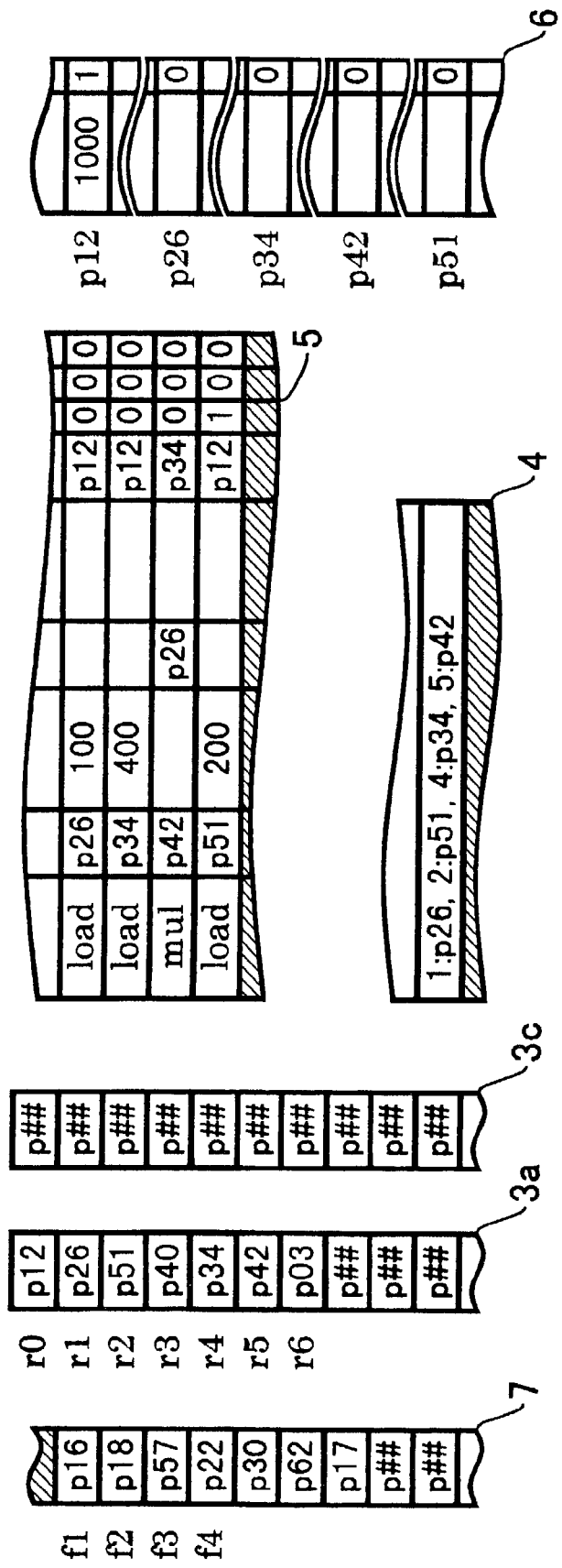

Substances of operations according with the contents of the Op field of instruction_1 are entered into the OQ, a modification according with the contents of the SM field is made on the AMF, and the substance of this modification is entered into the SMQ. At this juncture, each r0 in the instruction is replaced by p12, which is the pre-alteration (FIG. 6) content of the AMF entry of address 0, and f1, f2, f3 and f4 are respectively replaced by p26, p34, p42 and p51, which are taken out of the free list in order. In regard to the modification on the AMF, contents of entries corresponding to r1, r2, r4 and r5 are altered to p26, p51, p34 and p42, which replace f1, f4, f2 and f3, respectively. As for the IB field of each of the four OQ entries whose contents are shown in FIG. 7, "1" is entered for the bottom OQ entry as it is at the tail of the queue at this time, and "0" is entered for the other entries. Besides, in the S field of each of these four OQ entries, "0" is entered, which stands for "unexecuted".

In the WCF field of each of the newly allocated DF entries whose respective addresses are p26, p34, p42 and p51—respectively corresponding to f1, f2, f3 and f4—, "0" is entered. (It is supposed that, in the DF entry of address p12 corresponding to r0, the WCF-field content is "1" and data "1000" is already written.)

Besides, in this example action, from beginning to end, as branch tag, "0" is supposed to be forwarded from the instruction-issue unit, and to be written in the BT field of each OQ entry into which substance of an operation is entered.

And moreover, as Instruction_1 includes 3 load operations, their substances are not only entered into the OQ, but also delivered to the LSU.

Thus, the computer system in such a state as shown in FIG. 6 gets to be in such a state as shown in FIG. 7.

In the next cycle, following Instruction_1, Instruction_2 is to be issued.

In the same way as in the case of Instruction_1, substances of operations according with the contents of the Op field of instruction_2 are entered into the OQ, a modification according with the contents of the SM field is made on the AMF, and the substance of this modification is entered into the SMQ.

In the WCF field of each of the newly allocated DF entries whose respective addresses are p16, p18 and p57—respectively corresponding to f1, f2 and f3—, "0" is entered.

And moreover, as Instruction_2 includes a store operation, its substance is not only entered into the OQ, but also delivered to the LSU.

Besides, since p12, which replaced r0, was written into source-register fields on the OQ in the course of issue of Instruction_1 in the preceding cycle, contents of the corresponding DF entry are read out. As the WCF-field content turns out to be "1", read-out data "1000", together with DF-entry address "p12", is conveyed to the OQ. Then, on the OQ, by means of the associative function, data "1000" is written into the operand fields that respectively correspond to the source-register fields holding "p12".

Figure 8:
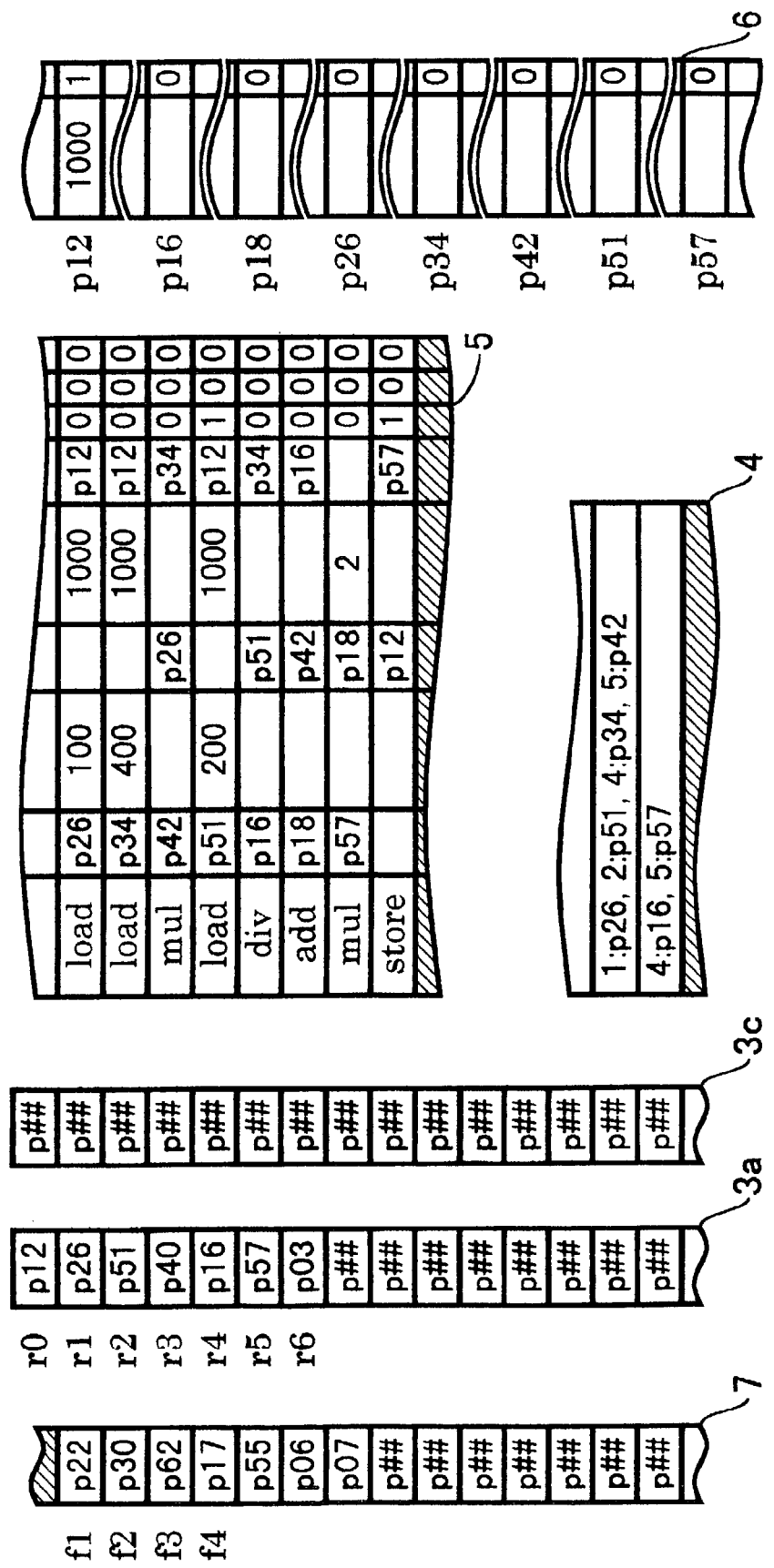

Thus, the computer system gets to be in such a state as shown in FIG. 8.

Unexecuted operations held in the OQ are to be executed out of order—each after becoming executable.

Figure 9:
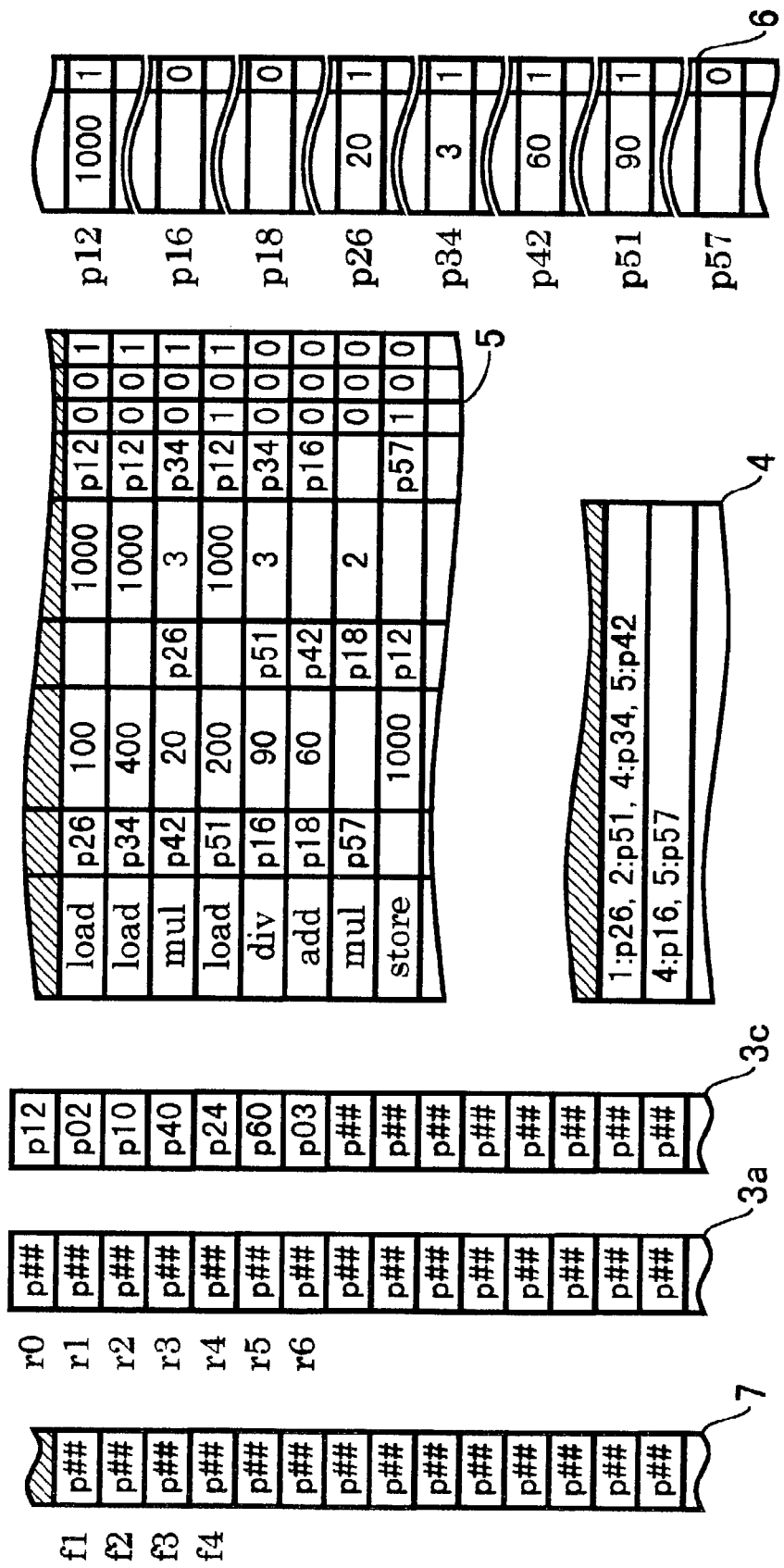

FIG. 9 shows the state that the computer system is in—after some cycles have gone by—when all the instructions issued before Instruction_1 have been completed and all the four operations contained in Instruction_1 have been terminated normally. As for each of the four OQ entries holding the substances of the operations contained in Instruction_1, each required operand data is already written in the operand field, the S-field content is "1", which stands for normal termination, and in the DF entry indicated in the destination-register field, data is already written and WCF-field content is "1". And, contents of the CMF at this point are the same as contents of the AMF right before of Instruction_1 was issued (FIG. 6). The system in this state is to complete Instruction_1 in the following manner.

As the top one of the eight OQ entries whose contents are shown in FIG. 9 is at the head of the queue at this point, four OQ entries ranging from that entry to the fourth entry, whose IB-field content is "1", are dequeued. As the top one of the two SMQ entries whose contents are shown in FIG. 9 is at the head of the queue at this point, a modification according with its substance is made on the CMF. Namely, contents of the CMF entries whose respective addresses are 1, 2, 4 and 5 are altered to p26, p51, p34 and p42, respectively. And moreover, the said head entry is dequeued on the SMQ.

Figure 10:
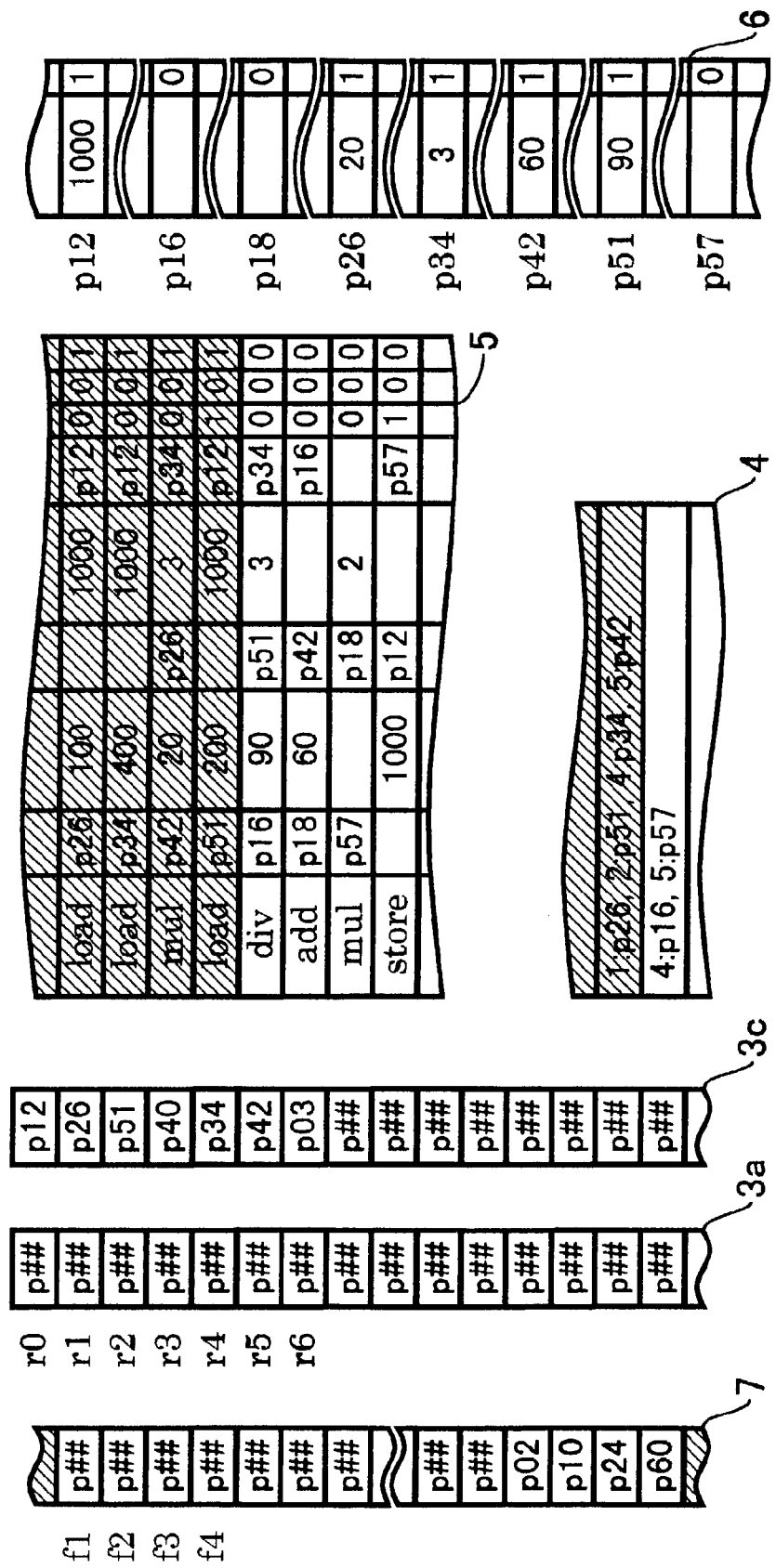

Besides, in accordance with completion of Instruction_1, each address of DF entry to be released from allocation is enqueued on the FL. In this case, pre-alteration contents of the CMF entries whose respective addresses are 1, 2, 4 and 5—p02, p10, p24 and p60, which are being altered—are read out and registered. (In this case, there is no destination-register-field content in the dequeued OQ entries that is not contained in the dequeued SMQ entry.) Thus, the computer system gets to be in such a state as shown in FIG. 10.

Figure 11:
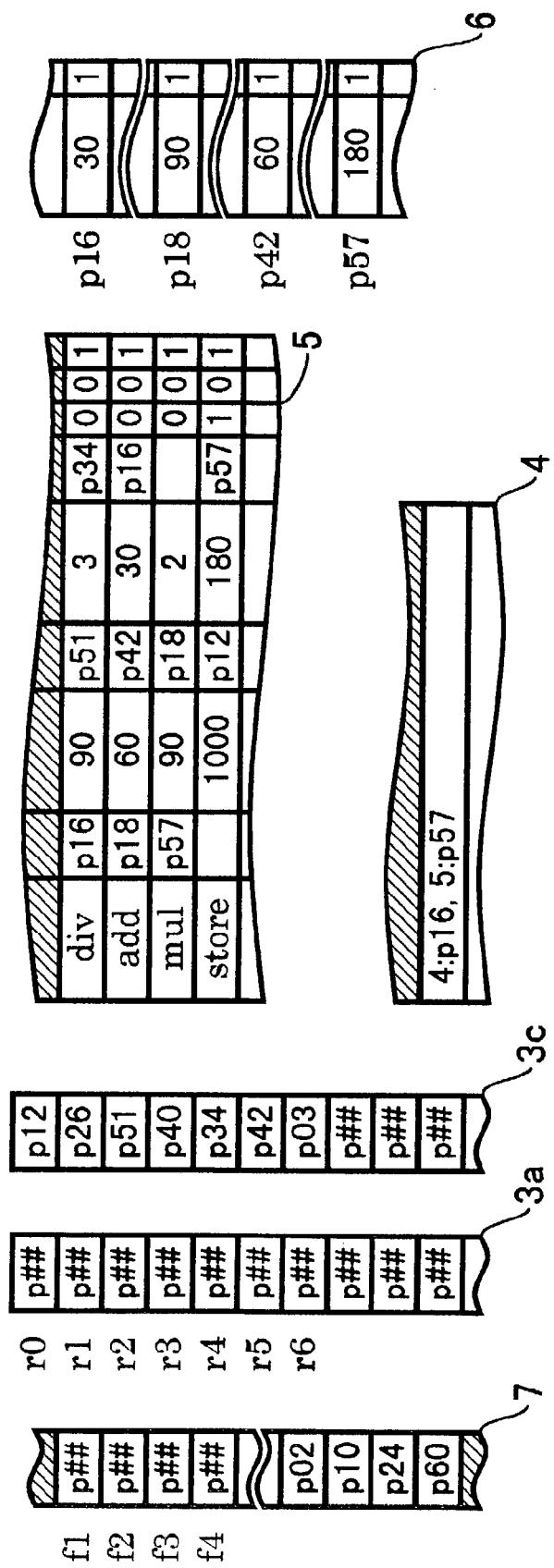

FIG. 11 shows the state that the computer system is in—after some further cycles have gone by—when three operations contained in Instruction_2 have been terminated normally and the store data and the store address have been both arranged for the last (store) operation.

Figure 12:
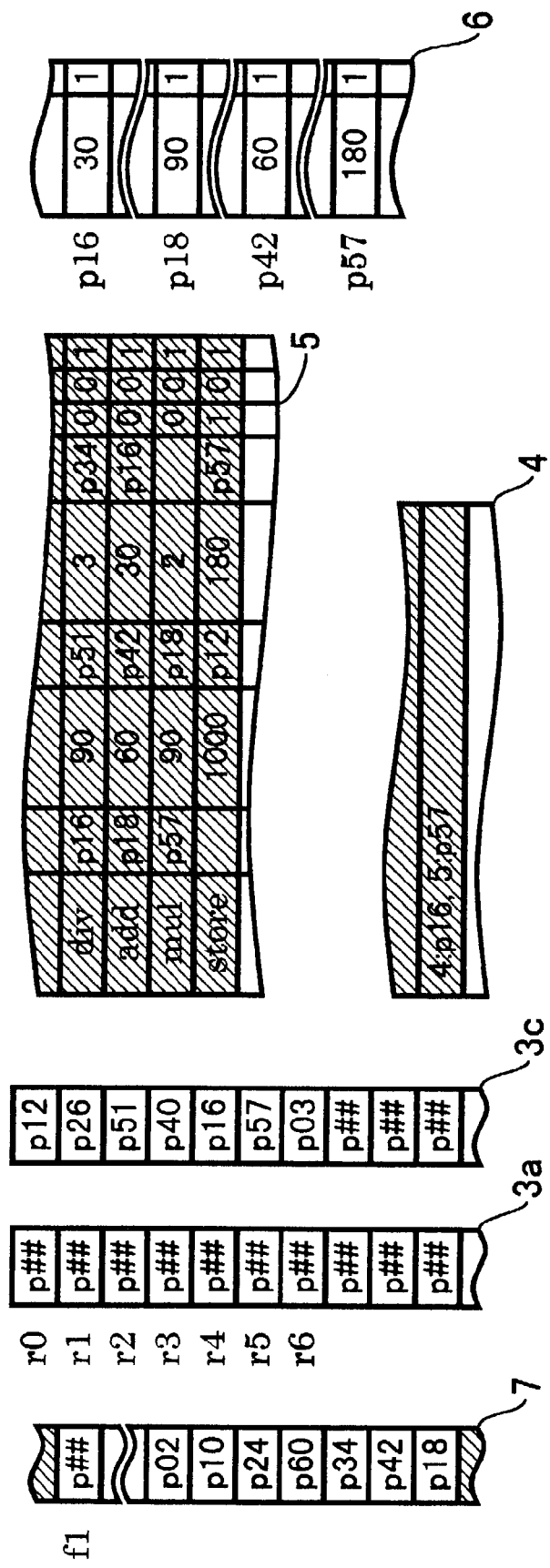

The system at the point of FIG. 11 is to complete Instruction_2 in a cycle in the same manner as in the case of Instruction_1. In this case, Instruction_2 includes a store operation, so the system requests the LSU to perform the store. Besides, in accordance with completion of the instruction, each address of DF entry to be released from allocation is enqueued on the FL. In this case, p34 and p42—pre-alteration contents of CMF entries that are being altered—, and p18—a destination-register-field content in the dequeued OQ entries that is not contained in the dequeued SMQ entry—are registered on the FL. Thus, the computer system gets to be in such a state as shown in FIG. 12.

Now, computation of $Y=(A*X+B/X)*2$ is concluded in the computer system of this embodiment.

(4) Stack Mode (4-1) Functions and Structures Required for the Action in the Stack Mode The functions and structures described in section (3-1) are needed in the stack mode as well. Here, functions and structures required additionally for the action in the stack mode are to be described. These are mainly concerned with the mapping files and the load/store unit (LSU).

(C+) Mapping Files and Fill-Flag File (FFF)

In the stack mode of the computer system of this embodiment, a mapping file and the data file (DF) are supposed to virtually construct an uppermost part of the operand stack. Namely, in the stack mode, each mapping file is to be used to hold a kind of stack. Such a state of the operand stack as { . . . , word4, word3, word2, word1} (the right end is the top of the stack) in a traditional stack machine corresponds to such a state of the stack held by mapping file as { . . . , d, c, b, a} (the right end is the top of the stack), with word1, word2, word3 and word4 respectively (to be) held in the data-file entries whose respective addresses are a, b, c and d, in the computer system of the present invention. When the operand stack grows so long, the remaining part is to be stored in the data buffer and the data cache.

Each mapping file can function as a circular buffer. For this, they have two kinds of registers: push pointer and bottom pointer. The push pointer indicates the entry over the top one of the stack held by the mapping file. The bottom pointer indicates the bottom entry of the stack held by the mapping file. You can know how many entries are vacant in the mapping file by subtracting the value of the push pointer from that of the bottom pointer. In the initialized state, the value of the push pointer and that of the bottom pointer are both set to be zero.

Besides, the computer system of this embodiment is furnished with a fill-flag file (FFF) having entries—provided in respective correspondence with the AMF/CMF entries—each of which is designed to hold one bit of information. Each FFF entry is supposed to hold "1" in the case where the DF entry indicated in the corresponding AMF/CMF entry holds a value filled from the data buffer, and hold "0" otherwise.

Figure 5:
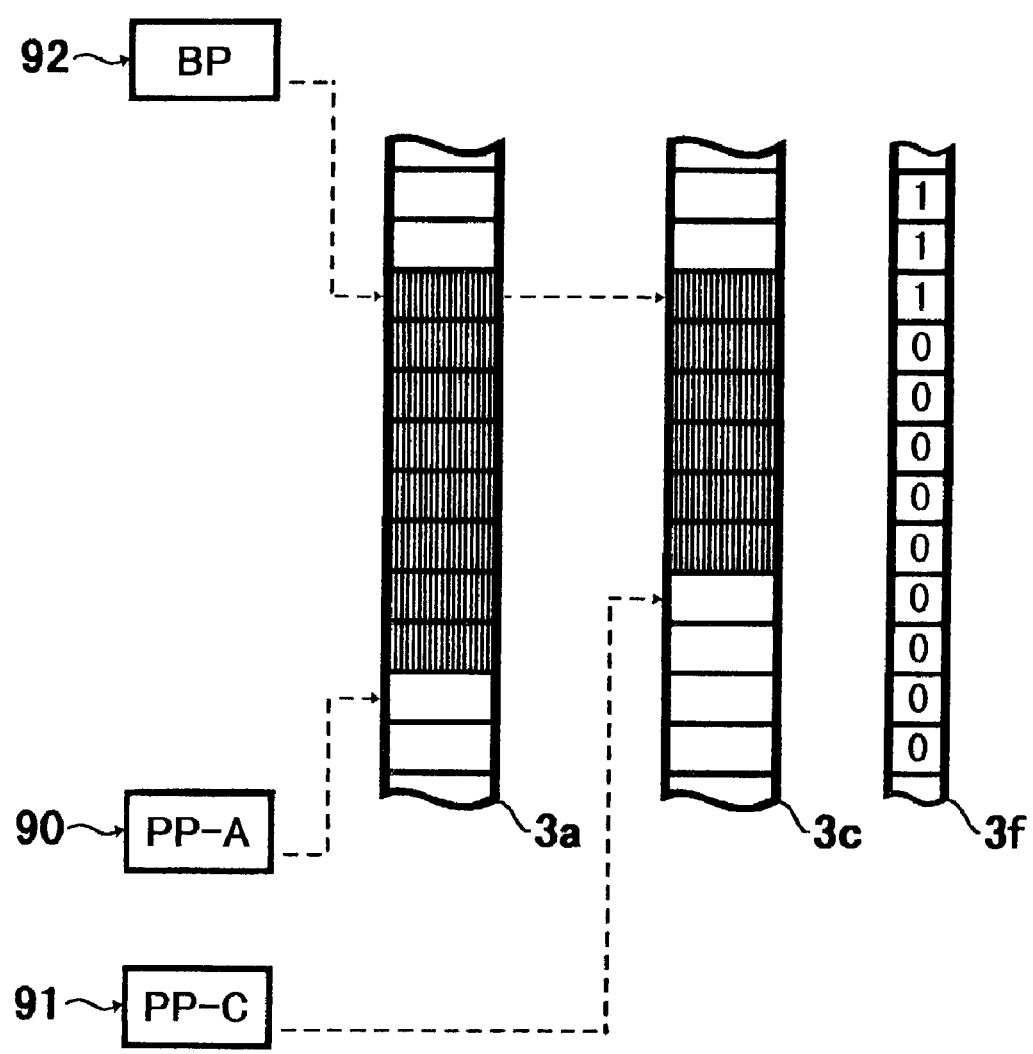
FIG. 5 shows the relation among the advanced mapping file, the completed mapping file, two push pointers, the bottom pointer, and the fill-flag file, each described later.

FIG. 5 shows the relation among two sets of mapping files and push pointers, the bottom pointer and the fill-flag file in the computer system of this embodiment. Two mapping files, the AMF 3*a* and the CMF 3*c*, and the fill-flag file (FFF) 3*f* have the same number of entries. And, on each mapping file, the entries are supposed to be tagged with address 0, 1, 2, . . . from the top downward. Each of the shaded entries of the AMF/CMF is supposed to hold a DF-entry address. As shown in FIG. 5, the AMF and the CMF are each furnished with a push pointer—respectively named PP-A and PP-C. On the other hand, only one bottom pointer is provided, which is shared between the AMF and the CMF. This is named BP. In the figures, the stack held by the AMF/CMF is supposed to grow downward. (H–3+) Load/Store Unit (LSU) and Data Buffer The data buffer is a circular buffer having entries each of which is designed to hold a word of data.

In the stack mode, the LSU is so structured as to be able to access the data buffer and the data cache.

In the stack mode of the computer system of this embodiment, while uppermost part of the operand stack is to be virtually constructed by means of a mapping file and the data file (DF), lower and even lower part are to be stored in the data buffer and in the data cache, respectively. As the LSU is supposed to be able to quickly access the data buffer, the larger proportion of variables to access the data buffer retains, the more efficiently the computation can proceed. And, by letting the data buffer retain an appropriate number of words of data, later-described spill/fill operations between the DF, the data buffer and the data cache can be streamlined.

The LSU is furnished with a register to hold a pointer to first local variable: vars register, which is not shown in the figures. In the computer system of this embodiment, though the storage area of the first local variable is either in the data buffer or in the data cache, the vars register is to hold the corresponding address in the data cache. Namely, even if all or part of the local variables are practically held in the data buffer, assuming that all the local variables were spilt into the data cache, you can associate each local variable with an address in the data cache. In processing a load/store operation, the LSU may perform an address calculation referring to the value of the vars register, judge whether the storage area of the object local variable is in the data buffer or in the data cache, and access the storage area.

The LSU is so structured as not only to process load/store operations specified in the program, but also to automatically perform spills/fills between the data buffer and the bottom of the stack constructed by means of the AMF/CMF and the DF in order to evade overflows/underflows.

A word of data can be spilt from the DF into the data buffer, when the following two conditions are satisfied (otherwise, the spill is to be deferred): (a) an identical content is held in the entry indicated by BP both in the AMF and in the CMF; and (b) there is no OQ entry in the queue whose source-register field holds the same DF-entry address as said identical content. The system could be so structured that condition (b) is always satisfied, by introducing certain restrictions on cases in which an address of DF entry used as source register of an operation included in an instruction is to remain in mapping file. If such restrictions are not introduced into the instruction system, the computer system needs to be so structured as to have the following function: comparing the content of each source-register field on the OQ with the same DF-entry address as said identical content, and checking in regard to condition (b). In the case where the above two conditions are satisfied, a word of data held in the DF entry indicated by the content of the AMF/CMF entry indicated by BP can be spilt into the data buffer. At this juncture, the value of BP is to be increased by one, and the address of said DF entry is to be registered on the FL.

Conversely, in filling the DF with a word of data from the data buffer, the system is to take a word of data to fill with out of the data buffer, assign to it a free DF entry, write the word into the data field of this entry, whose WCF-field content is set to be "1", decrease the value of BP by one, and write the address of the assigned DF entry into the entry indicated by decreased-by-one BP both on the AMF and on the CMF. At this juncture, "1" is to be entered into the FFF entry corresponding to the AMF/CMF entry into which the address of the DF entry is being written.

Besides, between the data buffer and the data cache, spills and fills are to be performed properly in accordance with vacancies in the data buffer.

The system can be so structured that, with two mapping files (the AMF and the CMF), the data buffer and the data cache each divided into interleaved banks, operations similar to the above are to be respectively performed between corresponding banks, so that a spill/fill operation of a plurality of words of data can be performed at once between the DF, the data buffer and the data cache. In this case, for spill/fill operations, each of the AMF, the CMF, the data buffer and the data cache needs to have a read/write port for each bank, and the DF needs to have as many read/write ports as the interleaved divisions.

The above is the basic functions and structures required additionally for the action in the stack mode (4-2) Action in the Stack Mode Next, the action in the stack mode of the computer system of this embodiment is described.

In the stack mode, in the same manner as in the register mode, the computer system of this embodiment processes instructions through four stages: [1] instruction-fetch, [2] instruction-issue, [3] operations-execution, and [4] instruction-completion stage. In the following, the action in each stage is described.

[1] Instruction-Fetch Stage

In this stage, the instruction-fetch unit fetches an instruction from the instruction cache, and determines the address of the instruction to fetch next.

[2] Instruction-Issue Stage

In this stage, substances of operations according with the contents of the Op field of the instruction to be issued are entered into the operation queue (OQ), a modification according with the contents of the SM field is made on the advanced mapping file (AMF) and its push pointer, PP-A, and the substance of this modification is entered into the state-modification queue (SMQ). At this juncture, s1, s2, s3, . . . in the instruction—which respectively correspond to top, 2nd, 3rd, . . . of the stack—are respectively replaced by pre-alteration contents of corresponding AMF entries, and f1, f2, . . . are respectively replaced by DF-entry addresses that are taken out of the free list (FL) in order.

In each of the entries of the fill-flag file (FFF) in the range corresponding to the AMF entries that are undergoing the modification—in the vicinity of the new top of the stack—, "0" is entered.

In the IB field of each OQ entry into which substance of an operation contained in the instruction is being entered, "1" is entered for the OQ entry getting to be at the tail of the queue, and "0" is entered for those otherwise. In the BT field of each of the OQ entries, the branch tag forwarded from the instruction-issue unit is entered.

In the WCF field of each of the DF entries newly allocated in the course of issue of the instruction (in respective correspondence with f1, f2, f3, . . . ), "0" is entered.

In the case of a load/store operation, its substance is not only entered into the OQ, but also, together with the address of the OQ entry into which the substance is being entered, delivered to the LSU.

As for each writing of a DF-entry address replacing any of s1, s2, s3, . . . into a source-register field on the OQ, in the next cycle, contents of the DF entry of that address will be read out. In the case of the WCF-field content being "1", the data, together with the DF-entry address, will be conveyed to the OQ. Then, on the OQ, each source-register-field content will be compared with the conveyed DF-entry address, and the data will be written into the operand field(s) corresponding to the matched source-register field(s).

[3] Operations-Execution Stage

Each of unexecuted operations held in the OQ is to be executed after becoming executable in the same manner as in the register mode.

[4] Instruction-Completion Stage

Instructions are completed in program-sequential order in the same manner as in the register mode except for the following.

To begin with, it is in conformity with the format inside the SM field of instruction—namely, entry format for the state-modification queue (SMQ)—for the stack mode that the modification that was made on the AMF in the course of issue of the instruction is reproduced on the CMF.

Besides, in accordance with completion of the instruction, each address of DF entry to be released from allocation is to be registered on the FL. In the stack mode, a set of addresses of DF entries to be released from allocation consists of the following two groups: the one(s) each being a DF-entry address to be eliminated from the stack by the alterations on the CMF and PP-C in the course of completion of the instruction, and the one(s) each being a destination-register-field content in the OQ entries to be dequeued that is not contained in the SMQ entry to be dequeued—not to be written in the CMF—.

The above is the overall action in the stack mode of the computer system of this embodiment.

(4-3) Example Action in the Stack Mode

Next, an example action is described. Now, let's consider processing, with the computer system of this embodiment, the above-mentioned program to compute Y=A*X+B/X consisting of the following two instructions:

Instruction_1
  Op{load f1, <4>; add f2, f1, 0; load f3, <1>; mul f4, f2, f3}
  SM{+2: f4, f1}
Instruction_2
  Op{load f1, <2>; div f2, f1, s1; add f3, s2, f2; store <5>, f3}
  SM{−2:}.

FIG. 13-19 show changes in the state of the computer system of this embodiment in the course of processing of the above program in order of time. With reference to these figures, detailed action is described below. In FIG. 13-19, the structure of each entry of the DF 6/OQ 5 is the same as in FIG. 3/FIG. 4.

Figure 13:
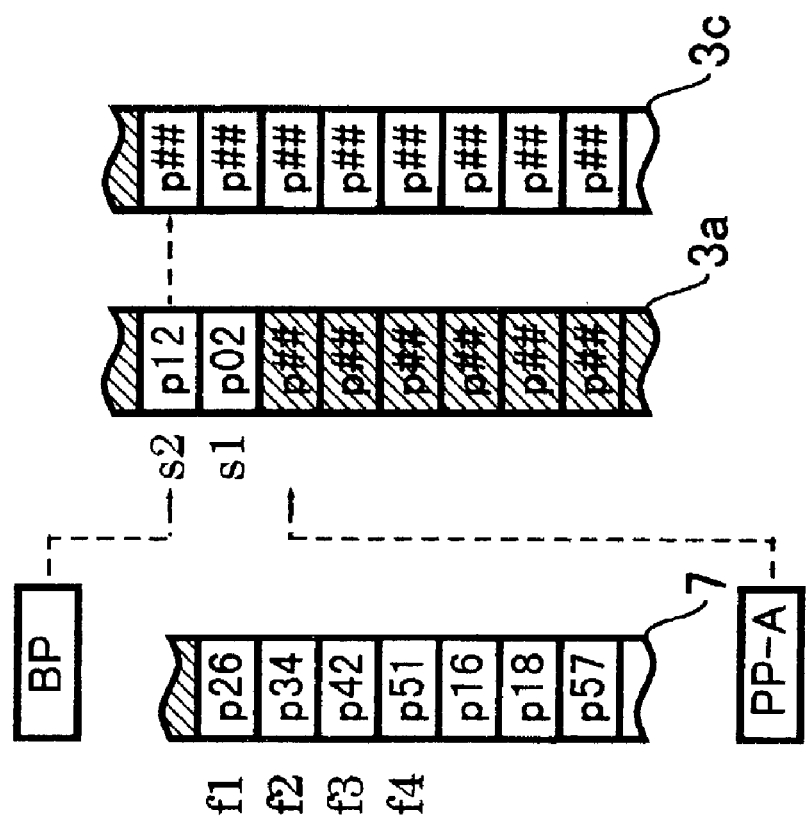
FIGS. 13-19 each show contents of the advanced mapping file, the completed mapping file, the state-modification queue, the operation queue, the data file, and the free list, at one of seven points in the course of an example action in the stack mode.

Let us suppose that contents of the FL/AMF are such as those shown in FIG. 13 at the outset. Here, as for the FL 7, which is constructed as a circular FIFO queue, it is shown that the four entries from the head one of the queue downward respectively correspond to f1, f2, f3 and f4 for the instruction to be issued next. As for the AMF, it is shown that the entries constituting the stack from the top downward correspond to s1, s2, . . . , respectively. As for places in which p### is entered, though a DF-entry address is written, you need not pay attention in the explanation of this example action. Besides, in this example action, it is supposed, for the sake of simplicity, that no spill/fill operation between the DF and the data buffer is to be performed. So, the value of BP does not fluctuate.

Let us suppose that Instruction_1 is to be issued when the computer system is in such a state as shown in FIG. 13.

Figure 14:
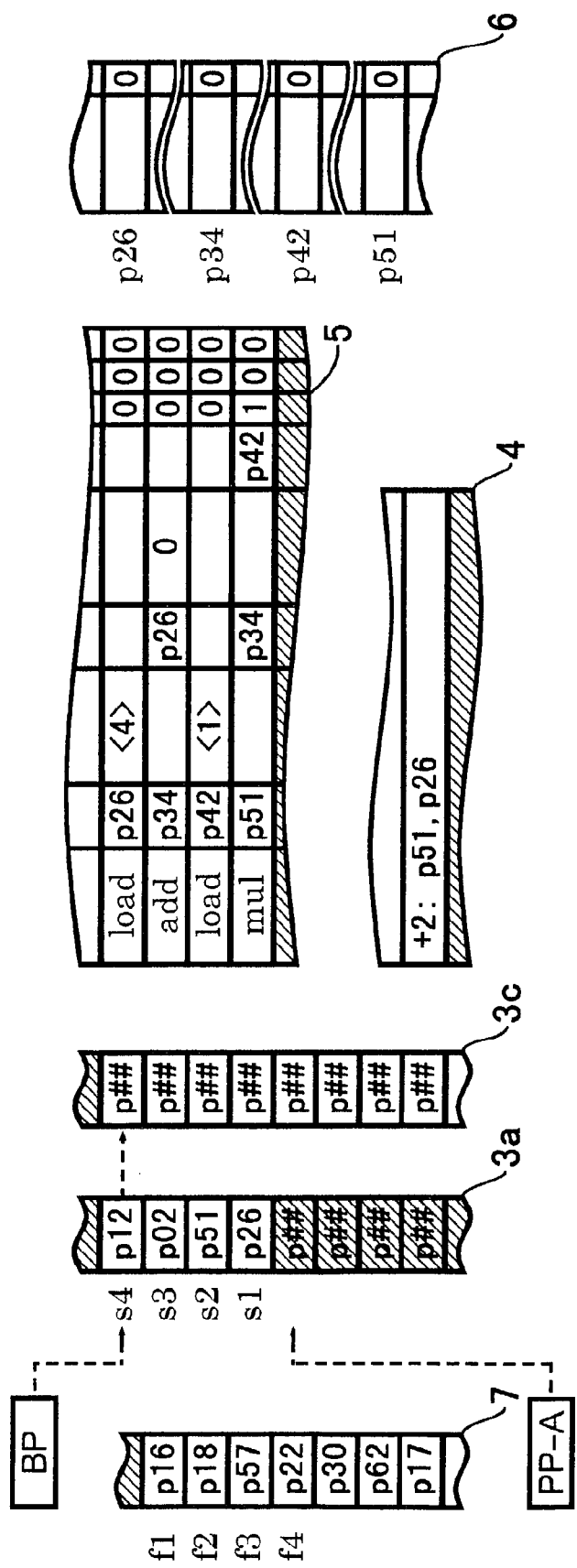

Substances of operations according with the contents of the Op field of instruction_1 are entered into the OQ, a modification according with the contents of the SM field is made on the AMF and PP-A, and the substance of this modification is entered into the SMQ. At this juncture, f1, f2, f3 and f4 in the instruction are respectively replaced by p26, p34, p42 and p51, which are taken out of the free list in order. In regard to the modification on the AMF, p26 and p51, replacing f1 and f4, are entered in the entries at and under the top of the stack grown by two entries, respectively. As for the IB field of each of the four OQ entries whose contents are shown in FIG. 14, "1" is entered for the bottom OQ entry as it is at the tail of the queue at this time, and "0" is entered for the other entries. Besides, in the S field of each of these four OQ entries, "0" is entered, which stands for "unexecuted".

In the WCF field of each of the newly allocated DF entries whose respective addresses are p26, p34, p42 and p51—respectively corresponding to f1, f2, f3 and f4—, "0" is entered.

Besides, in this example action, from beginning to end, as branch tag, "0" is supposed to be forwarded from the instruction-issue unit, and to be written in the BT field of each OQ entry into which substance of an operation is entered.

And moreover, as Instruction_1 includes 2 load operations, their substances are not only entered into the OQ, but also delivered to the LSU.

Thus, the computer system in such a state as shown in FIG. 13 gets to be in such a state as shown in FIG. 14.

In the next cycle, following Instruction_1 Instruction_2 is to be issued.

In the same way as in the case of Instruction_1, substances of operations according with the contents of the Op field of instruction_2 are entered into the OQ, a modification according with the contents of the SM field is made on the AMF and PP-A, and the substance of this modification is entered into the SMQ. At this juncture, s1 and s2 in the instruction are respectively replaced by p26 and p51, which are the pre-alteration (FIG. 14) contents of the corresponding AMF entries, and f1, f2 and f3 are respectively replaced by p16, p18 and p57, which are taken out of the free list in order. As only a negative growth of the stack is indicated in the SM field, no alteration is required on the AMF.

In the WCF field of each of the newly allocated DF entries whose respective addresses are p16, p18 and p57—respectively corresponding to f1, f2 and f3—, "0" is entered.

And moreover, as Instruction_2 includes a load operation and a store operation, their substances are not only entered into the OQ, but also delivered to the LSU.

Figure 15:
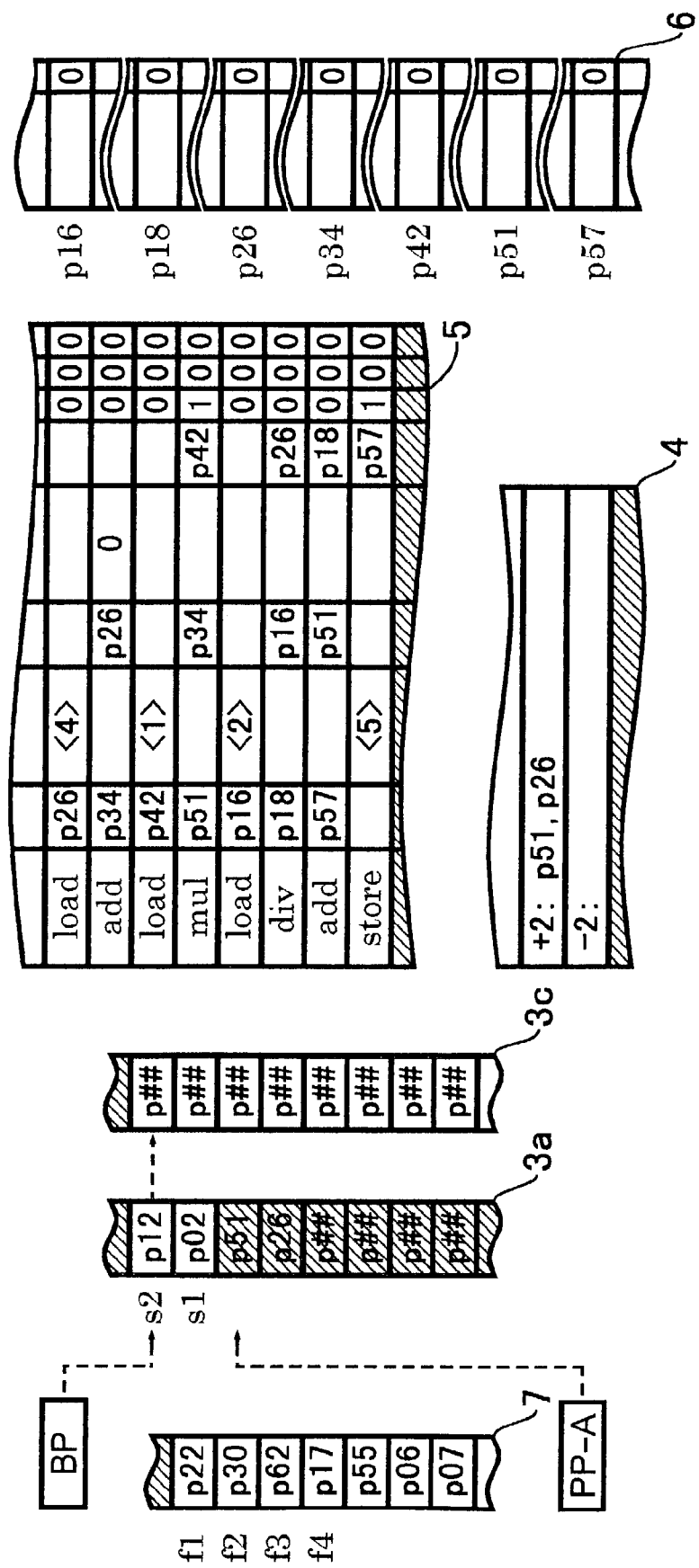

Thus, the computer system gets to be in such a state as shown in FIG. 15.

Unexecuted operations held in the OQ are to be executed out of order—each after becoming executable.

Figure 16:
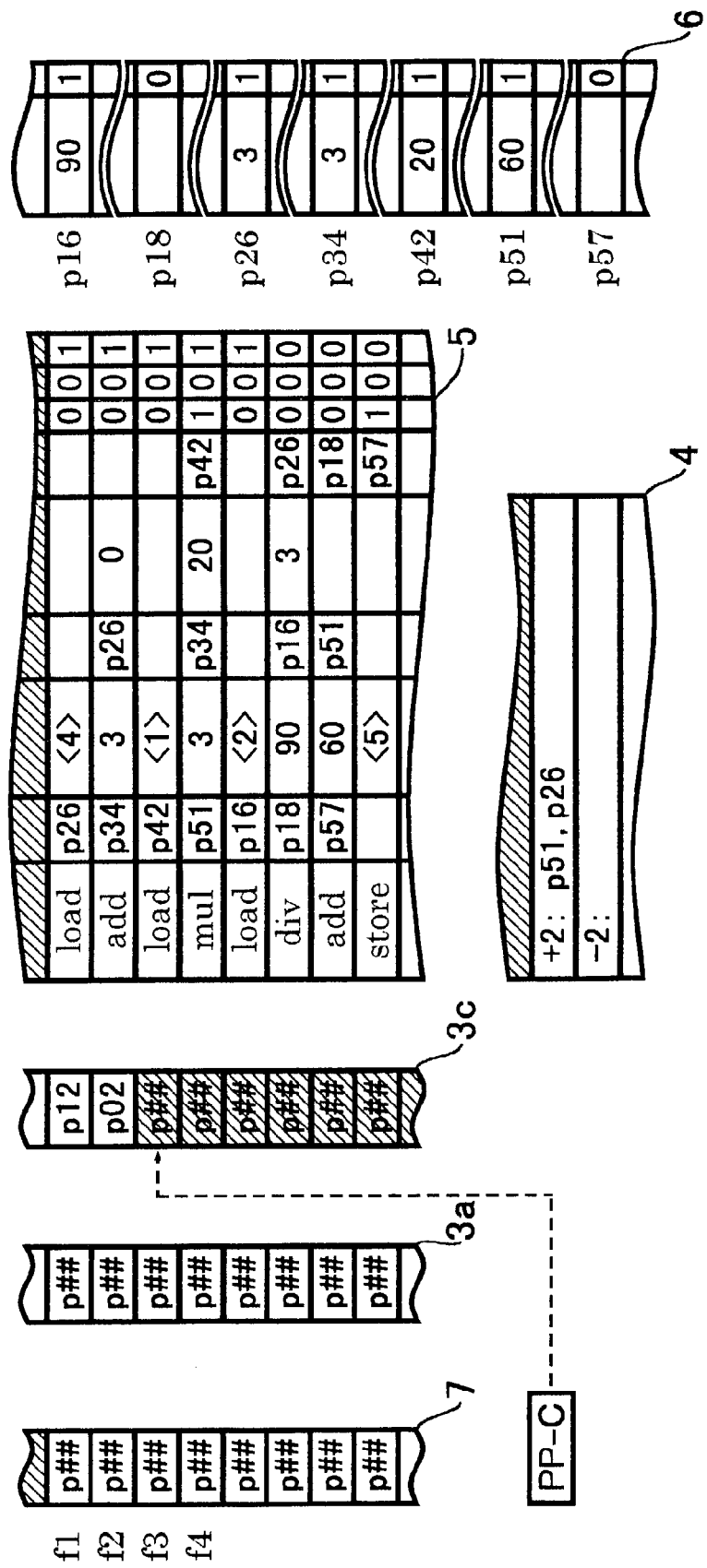

FIG. 16 shows the state that the computer system is in—after some cycles have gone by—when all the instructions issued before Instruction_1 have been completed and all the four operations contained in Instruction_1 have been terminated normally. As for each of the four OQ entries holding the substances of the operations contained in Instruction_1, each required operand data is already written in the operand field, the S-field content is "1", which stands for normal termination, and in the DF entry indicated in the destination-register field, data is already written and WCF-field content is "1". And, contents of the CMF and PP-C at this point are the same as contents of the AMF and PP-A right before Instruction_1 was issued (FIG. 13). The system in this state is to complete Instruction_1 in the following manner.

As the top one of the eight OQ entries whose contents are shown in FIG. 16 is at the head of the queue at this point, four OQ entries ranging from that entry to the fourth entry, whose IB-field content is "1", are dequeued. As the top one of the two SMQ entries whose contents are shown in FIG. 16 is at the head of the queue at this point, a modification according with its substance is made on the CMF and PP-C. Namely, 2 is added to the value of PP-C, and p26 and p51 are entered in the CMF entries at and under the top of the stack grown by two entries, respectively. And moreover, the said head entry is dequeued on the SMQ.

Figure 17:
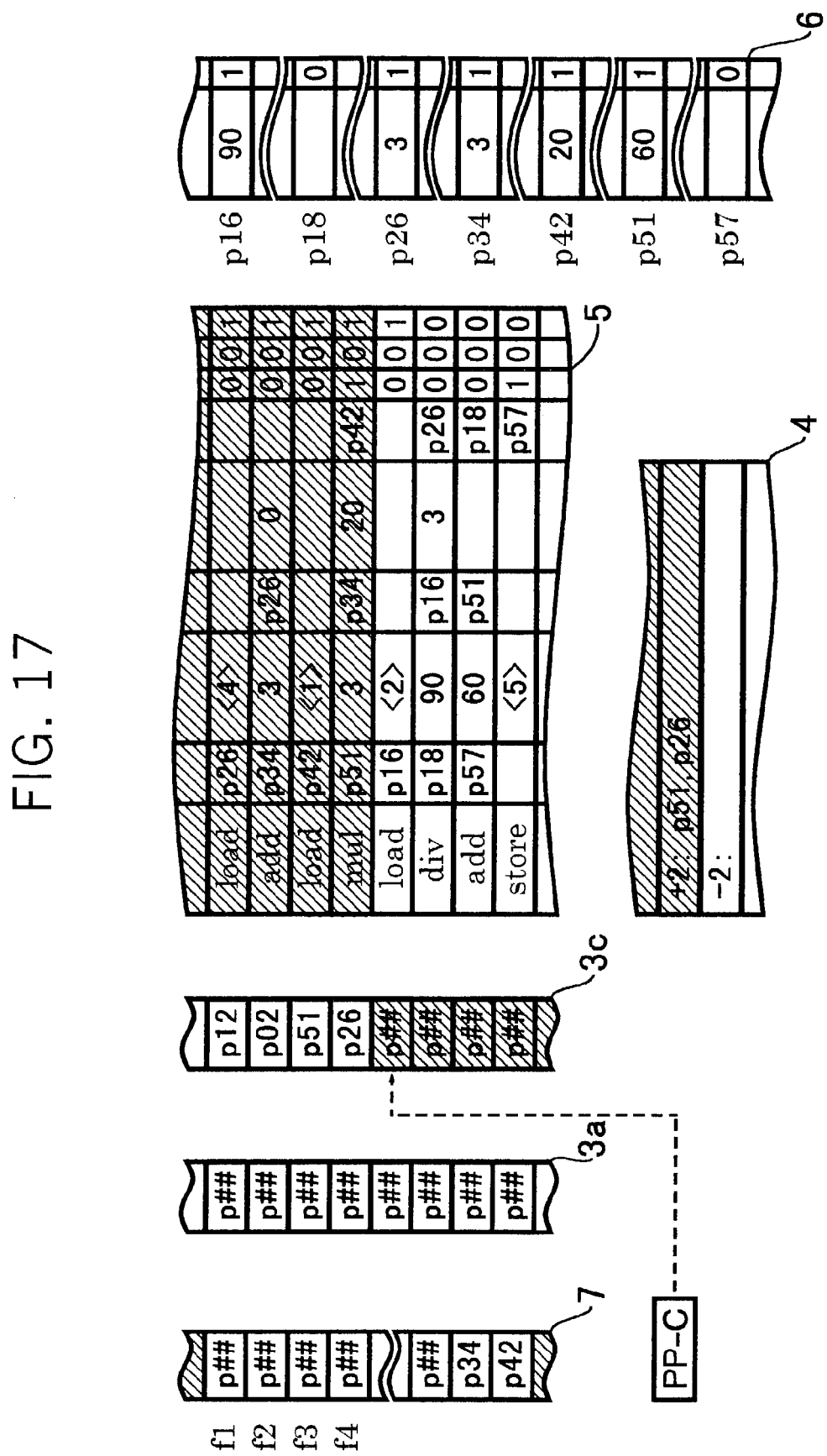

Besides, in accordance with completion of Instruction_1, each address of DF entry to be released from allocation is enqueued on the FL. In this case, p34 and p42—each being a destination-register-field content in the dequeued OQ entries that is not contained in the dequeued SMQ entry—are registered on the FL. (In this case, there is no DF-entry address that is eliminated from the stack by the alterations on the CMF and PP-C in the course of completion of the instruction.) Thus, the computer system gets to be in such a state as shown in FIG. 17.

Figure 18:
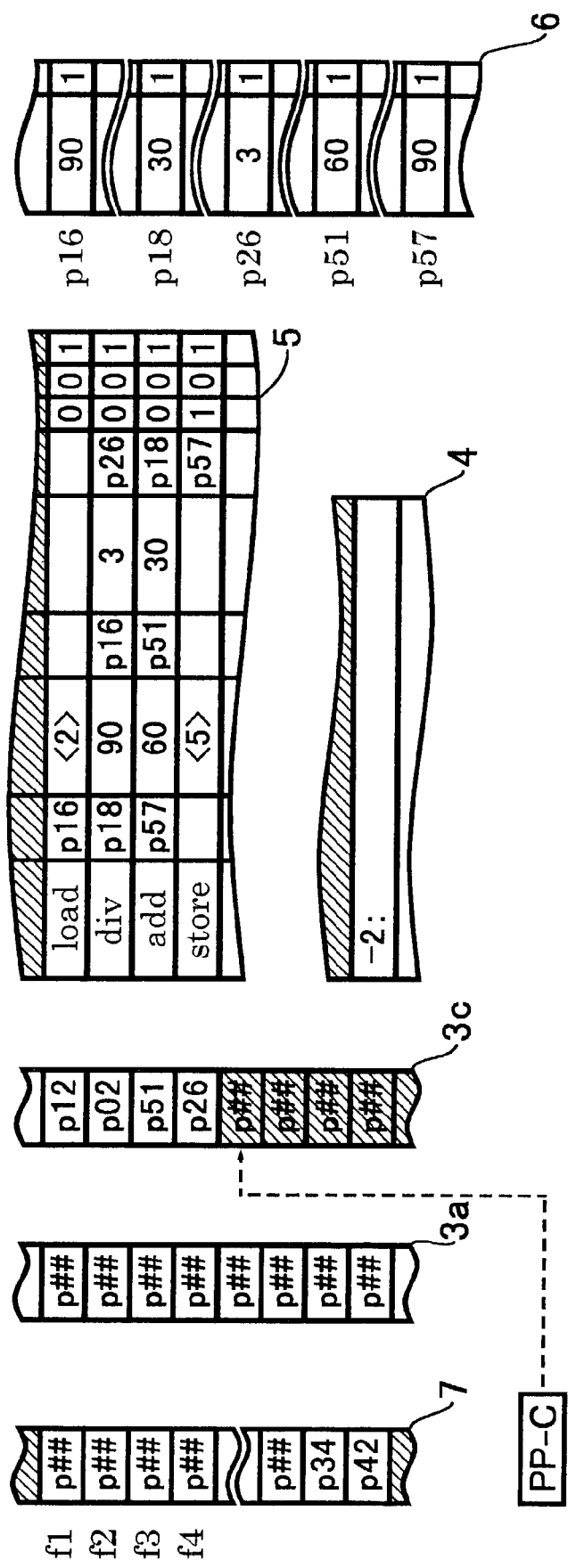

FIG. 18 shows the state that the computer system is in—after some further cycles have gone by—when three operations contained in Instruction_2 have been terminated normally and the store data and the store address have been both arranged for the last (store) operation.

Figure 19:
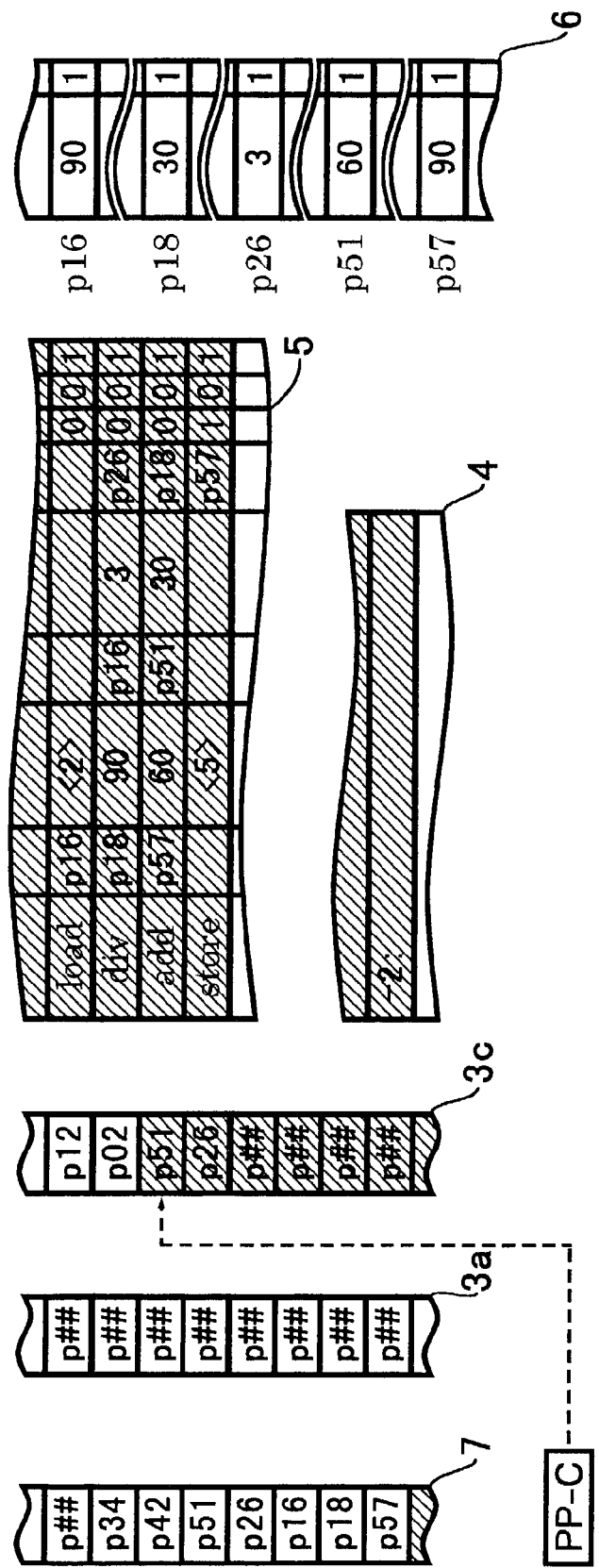

The system at the point of FIG. 18 is to complete Instruction_2 in a cycle in the same manner as in the case of Instruction_1. In this case, Instruction_2 includes a store operation, so the system requests the LSU to perform the store. Besides, in accordance with completion of the instruction, each address of DF entry to be released from allocation is enqueued on the FL. In this case, p51 and p26—each being a DF-entry address that is eliminated from the stack by the alterations on the CMF and PP-C in the course of completion of the instruction—, and p16, p18 and p57—each being a destination-register-field content in the dequeued OQ entries that is not contained in the dequeued SMQ entry—are registered on the FL. Thus, the computer system gets to be in such a state as shown in FIG. 19.

Now, computation of Y=A*X+B/X is concluded in the computer system of this embodiment.

(5) Speculative Execution

Speculative execution based on branch prediction can be incarnated in the computer system of the present invention. Furnishing with an AMF history file is for incarnation of speculative execution. Each time the instruction to be issued includes a conditional branch operation, contents of all the AMF entries and PP-A are supposed to be written into an AMF-history-file entry. In the following, how speculative execution based on branch prediction goes on in the computer system of this embodiment is described.

In the computer system of this embodiment, in the instruction-issue stage, from in the initialized state and till the first instruction including a conditional branch operation is issued, branch tag "0" is marked on each issued instruction and entered in the BT field of each OQ entry into which substance of an operation included in the instructions is entered.

When the first instruction including a conditional branch operation is issued, to preserve the state at the branch point, contents of all the AMF entries and PP-A are written into the AMF-history-file entry of address 0. After this, in the course of the instruction flow grounded on the branch prediction, branch tag "1" is marked and entered in BT fields of the OQ.

When the second instruction including a conditional branch operation is issued, in either the case where the first conditional branch is unsettled or the case where it has been settled and the prediction proved right, contents of all the AMF entries and PP-A are written into the AMF-history-file entry of address 1. In the course of the instruction flow grounded on the second branch prediction, branch tag "2" is marked and entered in BT fields of the OQ.

If the branch prediction system continues to make a hit, the process is to go on in the same manner, and writing into the AMF history file is to be carried out in the order of address. Besides, after writing into the AMF-history-file entry of address n, and till the next writing, branch tag n+1 is supposed to be marked on each issued instruction.

In the case where a branch prediction turns out to have missed, all the instructions issued after the one including the conditional branch operation are to be canceled, respectively corresponding contents of the AMF history file that were written when the instruction including the conditional branch operation was issued are to be copied into the AMF entries whose respectively corresponding contents of the FFF are "0" and into PP-A, and the issue process is to be resumed from the instruction at the right place. Here, in the register mode, the content of each FFF-entry is supposed to be "0". Besides, in canceling all the instructions issued after a certain one, each address of DF entry that has been allocated as destination register in the operations to be canceled is to be put back in the FL, and all the entries in the range that corresponds to the instructions to be canceled are to be dequeued both on the OQ and on the SMQ.

As above, in the computer system of the present invention, as the substance of the AMF at each point when an instruction including a conditional branch operation was issued can be reconstructed by using the AMF history file, speculative execution based on branch prediction is feasible.

(6) Other Embodiments

Computer systems according to the present invention are not confined to the above-mentioned embodiment. There may be various embodiments with different detailed structures. For example, the following can be listed.

(6-1) Embodiment A

A computer system according to the present invention can be so structured that, with a program that is conformed to the instruction format for a traditional register-based/stack-based processor stored in the instruction cache, the program is to be transformed on the fly right before the instruction-issue stage to conform to the instruction format prescribed in section (2).

(6-2) Embodiment B

A computer system according to the present invention can be so structured that, in the course of issue of each instruction, addresses of DF entries to be released from allocation when the instruction is completed or pieces of information for identifying them are entered in the state-modification queue or a specialized queue in advance.

(6-3) Embodiment C

Such a computer system can be incarnated, as to be furnished with an advanced and a completed register-type mapping file, an advanced and a completed stack-type mapping file, two push pointers and a bottom pointer, wherein both substance of a modification on register-type mapping file and that on stack-type mapping file and push pointer are to be indicated in the state-modification field of the instruction. In this case, an advanced mapping history file having entries each of which is designed to hold contents of the register-type advanced mapping file, the stack-type advanced mapping file and its push pointer, needs to be provided.

(6-4) Embodiment D

Many of the variations such as those conceivable for the register-based superscalar architecture can be applied to the computer system based on the present invention. For example, the following can be listed.

1. A system implementing the operation window by providing a reservation station at the input of each functional unit, and having a reorder buffer.
2. A system having a data file, a free list, functional units, etc. for each data type: integer/floating point, 32 bit/64 bit or the like.
3. A system having a plurality of sets each comprising an advanced mapping file, a completed mapping file and a fill-flag file, and being so structured as to change sets in each context switching.
4. A system having a plurality of sets each comprising an advanced mapping file, a completed mapping file, a fill-flag file, a state-modification queue, etc., and being so structured as to be able to process a plurality of threads in parallel.

Industrial Utility

According to the present invention, high-performance computer systems can be materialized. Besides, programs described in any machine language for traditional register-based/stack-based processors can be easily transformed to conform to the instruction format for the computer system of the present invention.

What is claimed is:

1. A computer system, comprising:
    a data file having entries each designed to be able to hold data;
    an advanced mapping file having entries each designed to be able to hold an entry address in said data file;
    a completed mapping file having entries each designed to be able to hold an entry address in said data file;
    a state-modification queue having entries each designed to be able to hold substance of a modification on said advanced mapping file associated with a group of operations, said substance of said modification on said advanced mapping file stored in said state-modification queue being capable of not comprising parts respectively corresponding to all operations of a set of operations, said set of operations consisting of all operations of said group of operations except for any operation/operations to write no result in said data file; and
    means for executing issued operations out of order,
    wherein:
    making a modification on said advanced mapping file, entering the substance of said modification into said state-modification queue, and issuing an operation/a group of operations associated with said modification on said advanced mapping file are each to be done in a cycle; and
    after the operation/every operation of the group associated with the modification on said advanced mapping file indicated by the substance in the entry at the head of said state-modification queue is terminated normally, a modification according with said substance in said entry at the head of said state-modification queue is to be made on said completed mapping file, and said entry at the head of said state-modification queue is to be dequeued.

2. The computer system according to claim 1, wherein:
    substance of a modification to be held by said state-modification queue can be presented in a form that indicates a change in an operand stack.

3. A computer system, comprising:
a data file having entries each designed to be able to hold data;
an advanced mapping file having entries each designed to be able to hold an entry address in said data file;
a completed mapping file having entries each designed to be able to hold an entry address in said data file;
a state-modification queue having entries each designed to be able to hold substance of a modification on said advanced mapping file associated with a group of operations, said substance of said modification on said advanced mapping file stored in said state-modification queue being capable of not comprising parts respectively corresponding to all operations of a set of operations, said set of operations consisting of all operations of said group of operations except for any operation/operations to write no result in said data file; and
means for executing issued operations out of order, wherein;
each time a modification is made on said advanced mapping file, the substance of said modification is to be entered into said state-modification queue and an operation/a group of operations associated with said modification is/are to be issued; and
after the operation/every operation of the group associated with the modification on said advanced mapping file indicated by the substance in the entry at the head of said state-modification queue is terminated normally, a modification according with said substance in said entry at the head of said state-modification queue is to be made on said completed mapping file, and said entry at the head of said state-modification queue is to be dequeued.

4. The computer system according to claim 3, wherein:
substance of a modification to be held by said state-modification queue can be presented in a form that indicates a change in an operand stack.

5. A computer system, comprising:
a data file having entries each designed to be able to hold data;
an advanced mapping file having entries each designed to be able to hold an entry address in said data file;
a completed mapping file having entries each designed to be able to hold an entry address in said data file;
a state-modification queue having entries each designed to be able to hold substance of a modification on said advanced mapping file associated with a group of operations, said substance of said modification on said advanced mapping file stored in said state-modification queue being capable of not comprising parts respectively corresponding to all result-generating operations of said group of operations, results of said result-generating operations being to be written in said data file; and
means for executing issued operations out of order, wherein:
making a modification on said advanced mapping file, entering the substance of said modification into said state-modification queue, and issuing an operation/a group of operations associated with said modification on said advanced mapping file are each to be done in a cycle; and
after the operation/every operation of the group associated with the modification on said advanced mapping file indicated by the substance in the entry at the head of said state-modification queue is terminated normally, a modification according with said substance in said entry at the head of said state-modification queue is to be made on said completed mapping file, and said entry at the head of said state-modification queue is to be dequeued.

6. The computer system according to claim 5, wherein:
substance of a modification to be held by said state-modification queue can be presented in a form that indicates a change in an operand stack.

7. A computer system, comprising:
a data file having entries each designed to be able to hold data;
an advanced mapping file having entries each designed to be able to hold an entry address in said data file;
a completed mapping file having entries each designed to be able to hold an entry address in said data file;
a state-modification queue having entries each designed to be able to hold substance of a modification on said advanced mapping file associated with a group of operations, said substance of said modification on said advanced mapping file stored in said state-modification queue being capable of not comprising parts respectively corresponding to all result-generating operations of said group of operations, results of said result-generating operations being to be written in said data file; and
means for executing issued operations out of order, wherein:
each time a modification is made on said advanced mapping file, the substance of said modification is to be entered into said state-modification queue and an operation/a group of operations associated with said modification is/are to be issued; and
after the operation/every operation of the group associated with the modification on said advanced mapping file indicated by the substance in the entry at the head of said state-modification queue is terminated normally, a modification according with said substance in said entry at the head of said state-modification queue is to be made on said completed mapping file, and said entry at the head of said state-modification queue is to be dequeued.

8. The computer system according to claim 7, wherein:
substance of a modification to be held by said state-modification queue can be presented in a form that indicates a change in an operand stack.

* * * * *